(12) United States Patent
Pfeifle et al.

(10) Patent No.: US 9,110,939 B2
(45) Date of Patent: Aug. 18, 2015

(54) METHOD AND APPARATUS FOR PROVIDING INCREMENTAL DATABASE UPDATES BASED ON DELTA PAGES

(71) Applicants: Martin Pfeifle, Seewald (DE); Boris Gumhold, Frankfurt (DE); Jonghyun Suh, Bad Soden (DE)

(72) Inventors: Martin Pfeifle, Seewald (DE); Boris Gumhold, Frankfurt (DE); Jonghyun Suh, Bad Soden (DE)

(73) Assignee: HERE GLOBAL B.V., Veldhoven (NL)

( * ) Notice: Subject to any disclaimer, the term of this patent is extended or adjusted under 35 U.S.C. 154(b) by 90 days.

(21) Appl. No.: 13/646,118

(22) Filed: Oct. 5, 2012

(65) Prior Publication Data

US 2014/0101096 A1    Apr. 10, 2014

(51) Int. Cl.
    *G06F 17/30* (2006.01)
(52) U.S. Cl.
    CPC .... *G06F 17/30345* (2013.01); *G06F 17/30241* (2013.01); *G06F 17/30575* (2013.01)
(58) Field of Classification Search
    CPC .... G06F 17/2211; G06F 2216/15; G06F 8/65
    USPC ................... 707/999.203, 624, 638
    See application file for complete search history.

(56) References Cited

U.S. PATENT DOCUMENTS

| | | | |
|---|---|---|---|
| 6,910,073 B2 * | 6/2005 | Banga et al. | 709/225 |
| 8,566,346 B2 * | 10/2013 | Richter et al. | 707/769 |
| 8,712,963 B1 * | 4/2014 | Douglis et al. | 707/637 |
| 2004/0162885 A1 | 8/2004 | Garg et al. | |
| 2009/0187336 A1 * | 7/2009 | Kawamata et al. | 701/200 |
| 2010/0306280 A1 | 12/2010 | Sapek | |
| 2011/0196838 A1 | 8/2011 | Zunger et al. | |
| 2012/0036150 A1 * | 2/2012 | Richter et al. | 707/769 |

OTHER PUBLICATIONS

Invitation to Pay Additional Fees and, Where Applicable, Protest Fee, Annex to Form PCT/ISA206—Communication Relating to the Results of the Partial International Search for International Application No. PCT/EP2013/070660, mailed Jul. 16, 2014, 4 pages.

* cited by examiner

*Primary Examiner* — Debbie Le
(74) *Attorney, Agent, or Firm* — Ditthavong & Steiner, P.C.

(57) ABSTRACT

An approach is provided for incremental database updates based on delta pages. An update platform determines at least one new page of a first database and at least one reference page of a second database. The update platform then processes and/or facilitates a processing of the at least one new page and the at least one reference page to determine at least one difference patch comprising one or more differences between the at least one new page and the at least one reference page. In one embodiment, the at least one new page can be constructed from the at least one reference page and the at least one difference patch.

18 Claims, 14 Drawing Sheets

METHOD AND APPARATUS FOR PROVIDING INCREMENTAL DATABASE UPDATES BASED ON DELTA PAGES

BACKGROUND

Service providers and device manufacturers (e.g., wireless, cellular, etc.) are continually challenged to deliver value and convenience to consumers by, for example, providing compelling network services. Many of these network services rely on large content databases to operate. For example, location-based services such as mapping and navigation traditionally rely on large geographic databases. Because of the large sizes of some of the databases, services providers may preconfigure or load the databases on client devices (e.g., embedded devices such as mobile phones, car head units, or personal navigation devices) to avoid potential issues such as network latency issues, data availability issues, data costs, and the like. However, by preloading the databases, service providers and device manufacturers face significant technical challenges to ensuring that the databases are up-to-date and consistent between server side components and the client devices. This problem is particularly acute for geographic databases where mapping and related data (e.g., point of interest data) can be frequently updated.

SOME EXAMPLE EMBODIMENTS

Therefore, there is a need for an approach for efficiently updating databases (e.g., geographic databases) by providing incremental database updates based on delta pages (e.g., generated using a binary difference computation).

According to one embodiment, a method comprises determining at least one new page of a first database. The method also comprises determining at least one reference page of a second database. The method further comprises processing and/or facilitating a processing of the at least one new page and the at least one reference page to determine at least one difference patch comprising one or more differences between the at least one new page and the at least one reference page. In one embodiment, the at least one new page can be constructed from the at least one reference page and the at least one difference patch.

According to another embodiment, an apparatus comprises at least one processor, and at least one memory including computer program code for one or more computer programs, the at least one memory and the computer program code configured to, with the at least one processor, cause, at least in part, the apparatus to determine at least one new page of a first database. The apparatus is also caused to determine at least one reference page of a second database. The apparatus is further caused to process and/or facilitate a processing of the at least one new page and the at least one reference page to determine at least one difference patch comprising one or more differences between the at least one new page and the at least one reference page. In one embodiment, the at least one new page can be constructed from the at least one reference page and the at least one difference patch.

According to another embodiment, a computer-readable storage medium carries one or more sequences of one or more instructions which, when executed by one or more processors, cause, at least in part, an apparatus to determine at least one new page of a first database. The apparatus is also caused to determine at least one reference page of a second database. The apparatus is further caused to process and/or facilitate a processing of the at least one new page and the at least one reference page to determine at least one difference patch comprising one or more differences between the at least one new page and the at least one reference page. In one embodiment, the at least one new page can be constructed from the at least one reference page and the at least one difference patch.

According to another embodiment, an apparatus comprises means for determining at least one new page of a first database. The apparatus also comprises means for determining at least one reference page of a second database. The apparatus further comprises means for processing and/or facilitating a processing of the at least one new page and the at least one reference page to determine at least one difference patch comprising one or more differences between the at least one new page and the at least one reference page. In one embodiment, the at least one new page can be constructed from the at least one reference page and the at least one difference patch.

According to one embodiment, a method comprises receiving at least one update package at a device. The at least one update package comprises at least one difference patch based, at least in part, on one or more differences between at least one new page of a first database and at least one reference page of a second database associated with the device. In one embodiment, the at least one new page can be constructed from the at least one reference page and the at least one difference patch.

According to another embodiment, an apparatus comprises at least one processor, and at least one memory including computer program code for one or more computer programs, the at least one memory and the computer program code configured to, with the at least one processor, cause, at least in part, the apparatus to receive at least one update package at a device. The at least one update package comprises at least one difference patch based, at least in part, on one or more differences between at least one new page of a first database and at least one reference page of a second database associated with the device. In one embodiment, the at least one new page can be constructed from the at least one reference page and the at least one difference patch.

According to another embodiment, a computer-readable storage medium carries one or more sequences of one or more instructions which, when executed by one or more processors, cause, at least in part, an apparatus to determine at least one new page of a first database. The apparatus is also caused to receive at least one update package at a device. The at least one update package comprises at least one difference patch based, at least in part, on one or more differences between at least one new page of a first database and at least one reference page of a second database associated with the device. In one embodiment, the at least one new page can be constructed from the at least one reference page and the at least one difference patch.

According to another embodiment, an apparatus comprises means for receiving at least one update package at a device. The at least one update package comprises at least one difference patch based, at least in part, on one or more differences between at least one new page of a first database and at least one reference page of a second database associated with the device. In one embodiment, the at least one new page can be constructed from the at least one reference page and the at least one difference patch.

In addition, for various example embodiments of the invention, the following is applicable: a method comprising facilitating a processing of and/or processing (1) data and/or (2) information and/or (3) at least one signal, the (1) data and/or (2) information and/or (3) at least one signal based, at least in part, on (or derived at least in part from) any one or any combination of methods (or processes) disclosed in this application as relevant to any embodiment of the invention.

For various example embodiments of the invention, the following is also applicable: a method comprising facilitating access to at least one interface configured to allow access to at least one service, the at least one service configured to perform any one or any combination of network or service provider methods (or processes) disclosed in this application.

For various example embodiments of the invention, the following is also applicable: a method comprising facilitating creating and/or facilitating modifying (1) at least one device user interface element and/or (2) at least one device user interface functionality, the (1) at least one device user interface element and/or (2) at least one device user interface functionality based, at least in part, on data and/or information resulting from one or any combination of methods or processes disclosed in this application as relevant to any embodiment of the invention, and/or at least one signal resulting from one or any combination of methods (or processes) disclosed in this application as relevant to any embodiment of the invention.

For various example embodiments of the invention, the following is also applicable: a method comprising creating and/or modifying (1) at least one device user interface element and/or (2) at least one device user interface functionality, the (1) at least one device user interface element and/or (2) at least one device user interface functionality based at least in part on data and/or information resulting from one or any combination of methods (or processes) disclosed in this application as relevant to any embodiment of the invention, and/or at least one signal resulting from one or any combination of methods (or processes) disclosed in this application as relevant to any embodiment of the invention.

In various example embodiments, the methods (or processes) can be accomplished on the service provider side or on the mobile device side or in any shared way between service provider and mobile device with actions being performed on both sides.

For various example embodiments, the following is applicable: An apparatus comprising means for performing the method of any of originally filed claims 1-10.

Still other aspects, features, and advantages of the invention are readily apparent from the following detailed description, simply by illustrating a number of particular embodiments and implementations, including the best mode contemplated for carrying out the invention. The invention is also capable of other and different embodiments, and its several details can be modified in various obvious respects, all without departing from the spirit and scope of the invention. Accordingly, the drawings and description are to be regarded as illustrative in nature, and not as restrictive.

BRIEF DESCRIPTION OF THE DRAWINGS

The embodiments of the invention are illustrated by way of example, and not by way of limitation, in the figures of the accompanying drawings.

DESCRIPTION OF SOME EMBODIMENTS

Examples of a method, apparatus, and computer program for providing incremental database updates based delta pages are disclosed. In the following description, for the purposes of explanation, numerous specific details are set forth in order to provide a thorough understanding of the embodiments of the invention. It is apparent, however, to one skilled in the art that the embodiments of the invention may be practiced without these specific details or with an equivalent arrangement. In other instances, well-known structures and devices are shown in block diagram form in order to avoid unnecessarily obscuring the embodiments of the invention.

Figure 1A:
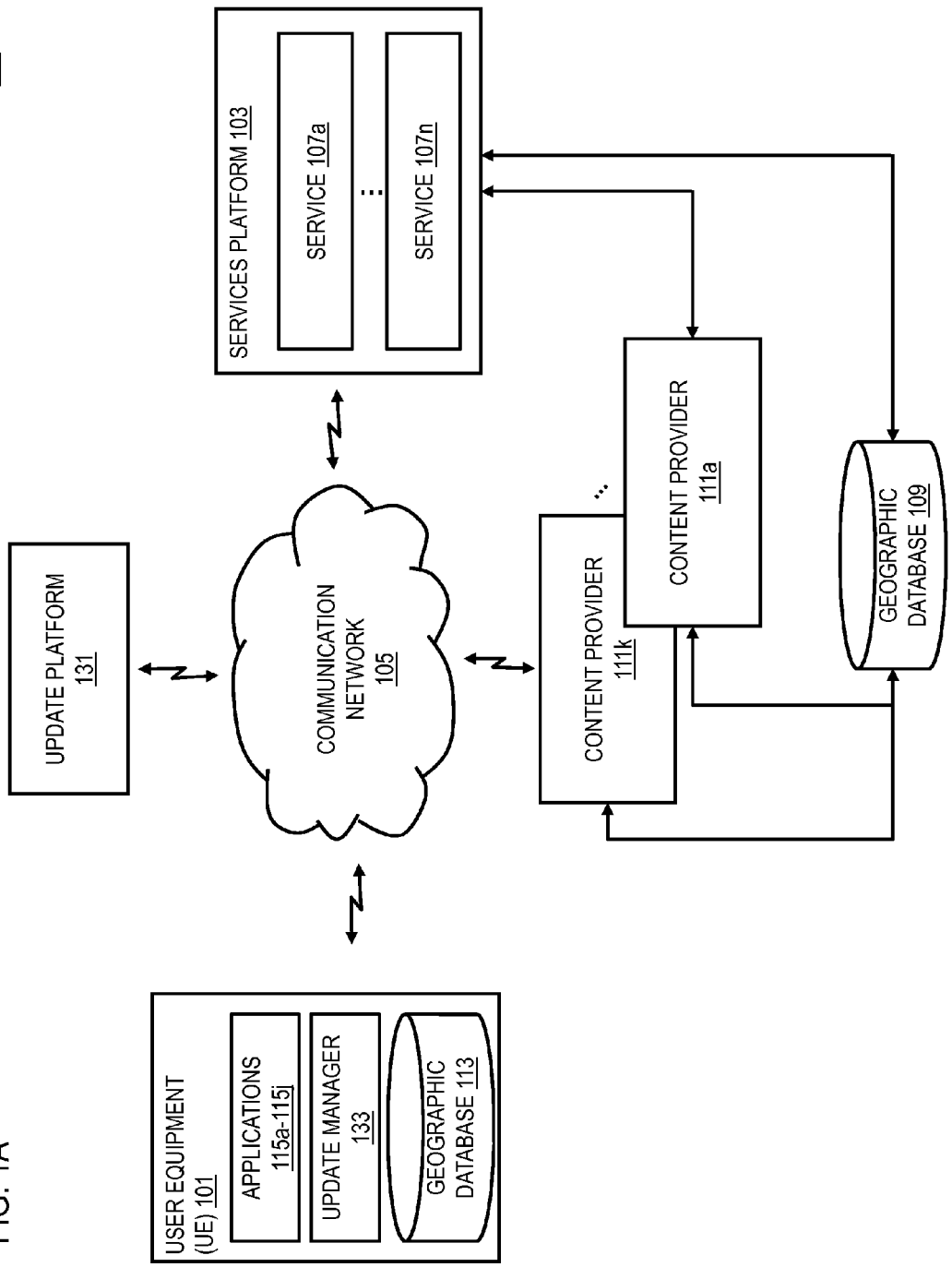
FIG. 1A is a diagram of a system capable of providing incremental database updates based on delta pages, according to one embodiment.

FIG. 1A is a diagram of a system capable of providing incremental database updates based on delta pages, according to one embodiment. As shown in FIG. 1A, a system 100 comprises at least one user equipment (UE) 101 (e.g., an embedded device such as a mobile phone, car head unit, personal navigation device, etc.) with connectivity to a service platform 103 over a communication network 105. In one embodiment, the service platform 103 includes one or more services 107a-107n (also collectively referred to as services 107) (e.g., navigation services, media content services, etc.) that provide service functions and/or content using information or data stored in one or more databases (e.g., a geographic database 109 in the case of location-based services and as shown in FIG. 1A).

In one embodiment, the databases (e.g., the geographic database 109) are maintained by one or more content providers 111a-111k (also collectively referred to as content providers 111). In one embodiment, a content provider 111 can be a map content provider that provides mapping and location information in the form of the geographic database 109. By way of example, the content providers 111 maintain the geographic database 109 as a server side component that is kept up-to-date. For example, updating the geographic database 109 by the content providers 111 can take place periodically. It is noted that although various embodiments are discussed with respect to the geographic database 109, it is contemplated that the various embodiments described herein are applicable to any type of database including, for instance, media content databases, user information databases, databases of analytical data, etc.

In one embodiment, the UE 101 is a client of at least one of the services 107 (e.g., a location-based service such as a mapping or navigation service) that depends on the information from the server side geographic database 109. Accordingly, the UE 101 includes a version of all or a portion of geographic database 109 that is stored locally at the UE 101 as the geographic database 113. By way of example, the UE 101 can execute one or more applications 115a-115j (e.g., client applications of the services 107) to access the locally stored geographic database 113.

Figure 1B:
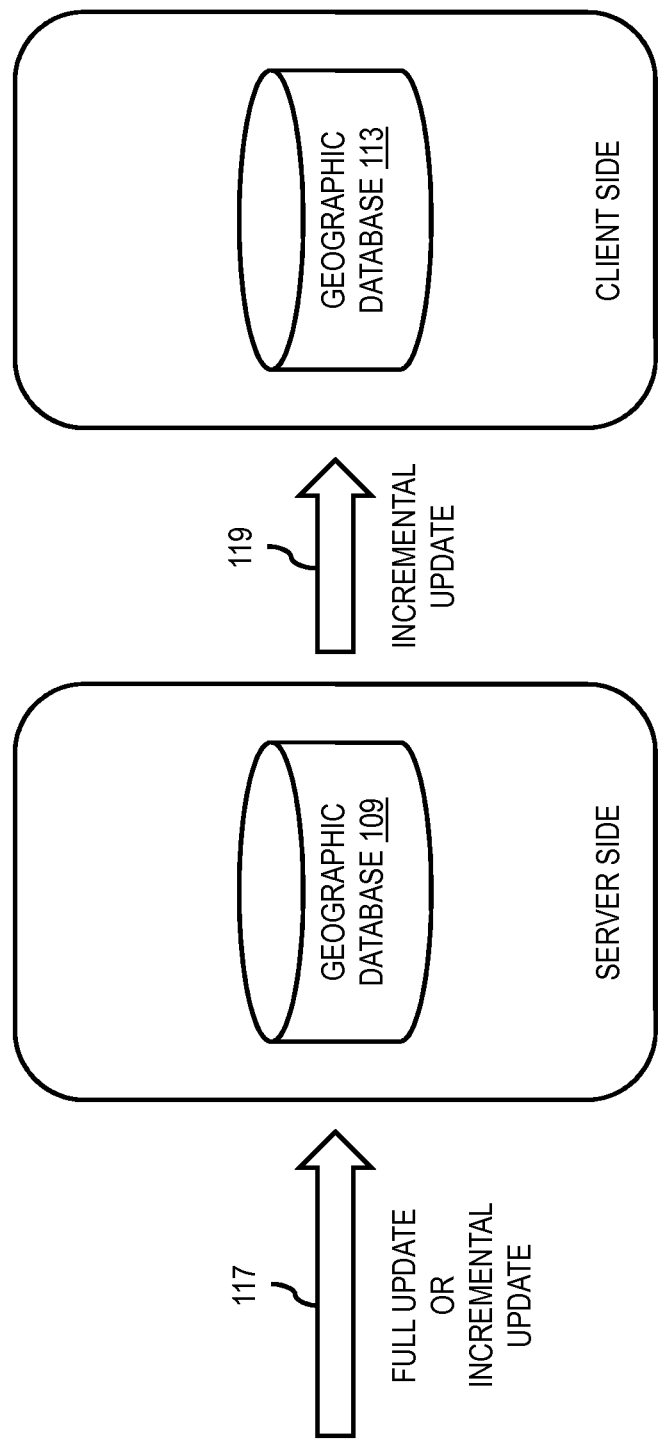
FIG. 1B is a diagram of a server to client database update process, according to one embodiment.

As shown in FIG. 1B, typically the services 107 and/or content providers 111 maintain the server-side geographic database 109 by providing a server side update 117 either incrementally or as a full update through substituting the geographic database 109 regularly (e.g., quarterly, annually, etc.) with a more recent database. For example, incremental updates may be performed to incorporate smaller changes (e.g., high priority updates (HPUs)) while full updates can be used to incorporate larger changes.

Generally, server side updates 117 do not occur concurrently with the client side updates 119 to the corresponding client side geographic database 113. As a result, there can be differences or changes in the server side geographic database 109 that needs to be incorporated into the client side geographic database 113. Accordingly, service providers and device manufacturers face technical challenges related to determining how to update the client side geographic database 113 efficiently if the corresponding geographic database 109 on the server side has been updated. More specifically, service providers and device manufacturers face challenges related to: (1) ensuring that update packages for the client side geographic database 113 are as small as possible to reduce potential resources burden (e.g., the amount of data to download by the UE 101 should small); (2) ensuring that UE 101 can use the update data on the client side immediately and with low memory consumption; and (3) ensuring that the client side geographic database 113 remains in a consistent state even if the connection to the server breaks.

Additional technical challenges also present themselves in the way that databases (and geographic databases in particular) are accessed by embedded devices such as the UE 101. For example, typically the geographic database 113 (e.g., Navigation Database Standard (NDS), NAVTEQ MPE database, Nokia MOS database, Ariba, etc.) model map data in some proprietary structured stored in files. In order to process such databases efficiently in the UE 101, the application 115 reads equal-sized chunks of data, called "pages", from the locally stored geographic database 113 located on secondary storage (e.g., hard disk, flash memory, etc.) into device memory. By way of example, page-based access or updates to the geographic databases 109 and 113 can present certain problems as described below with respect to FIGS. 1C-1E.

Figure 1C:
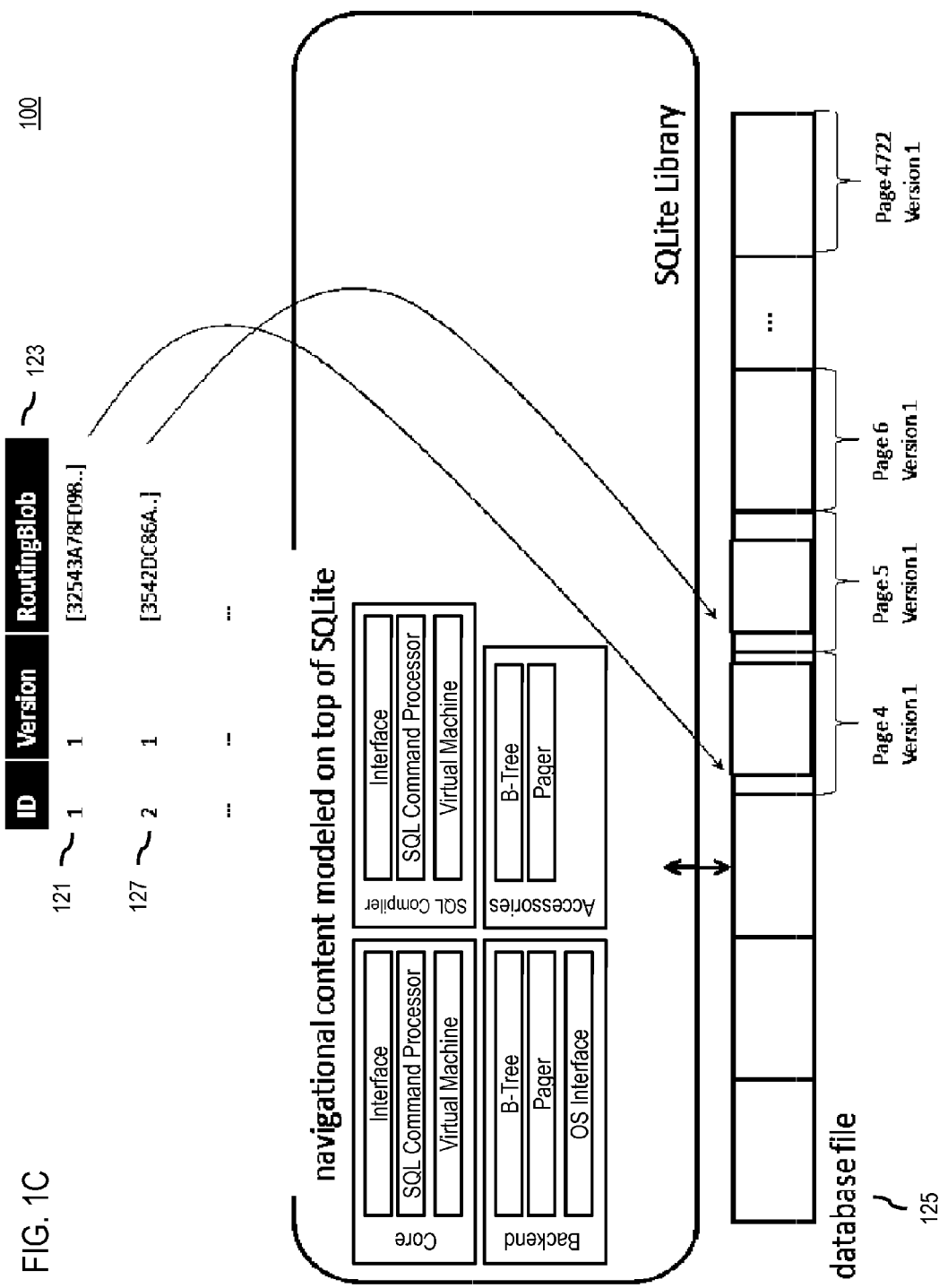
FIG. 1C is a diagram illustrating a mapping of relational content to database pages, according to one embodiment.

As shown in FIG. 1C, a relational database system (e.g., SQLite) such as used for storing the geographic databases 109 and 113, stores the description of the relational tables and their content in flat files. In one embodiment, the flat file is divided into pages (e.g., equally sized data chunks of $2^n$ bytes, such as 1 Kbyte, 8 Kbyte, 32 Kbyte, etc.). In one embodiment, if possible, the relational system stores the data of one row of an SQL-table consecutively within the file. In the FIG. 1C, for instance, the first record 121 of the relational table 123 is mapped to page 4 of in the database file 125, and the second record 127 is mapped to page 5 in the database file 125.

Figure 1D:
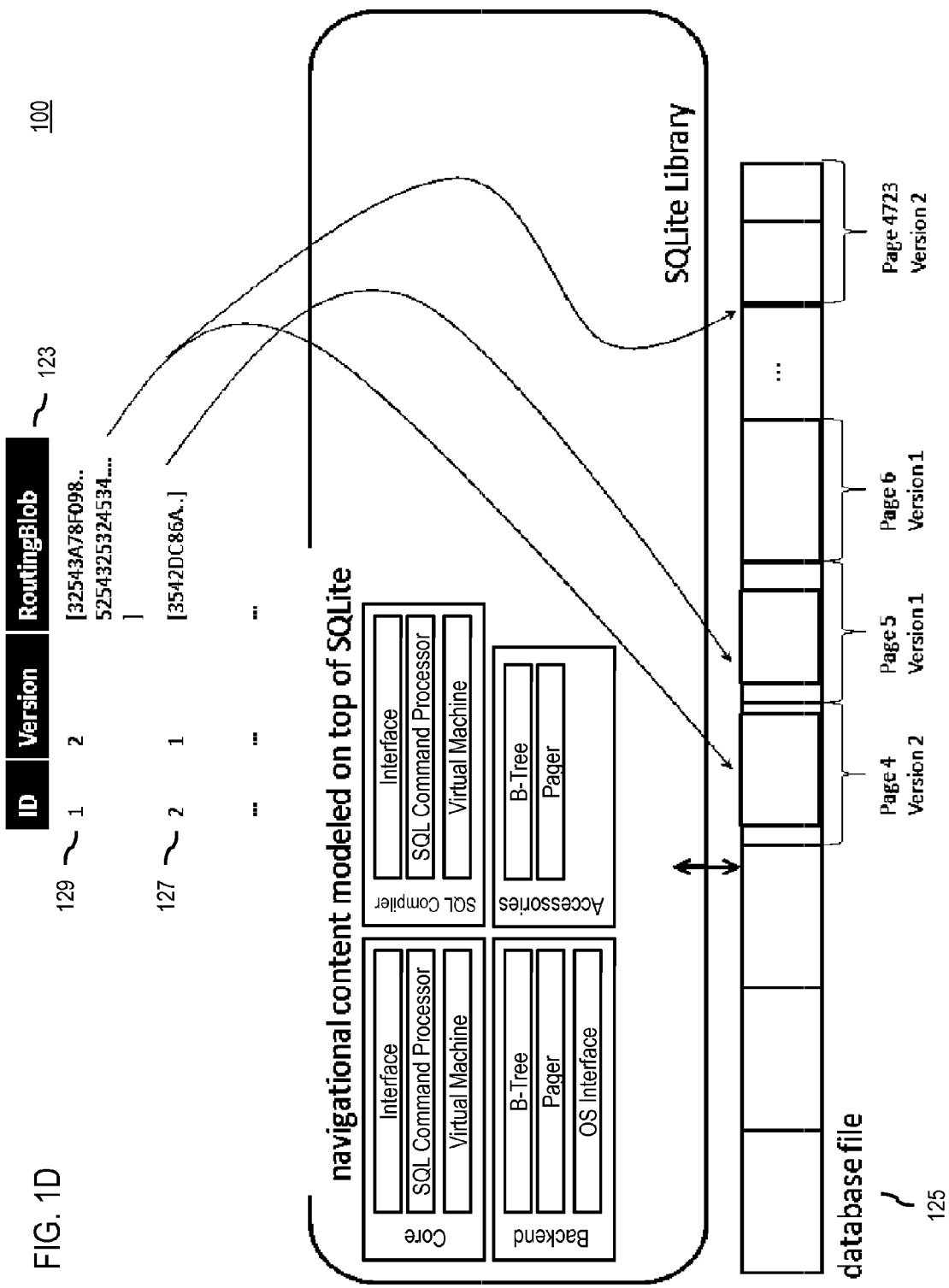
FIG. 1D is a diagram illustrating a mapping of relational content to database pages after an incremental update, according to one embodiment.

In one embodiment, the page structure enables the client application 115 to update only those pages from the server side geographic database 109 that have changed. To this end, versioning can be used on the page level (e.g., in FIG. 1C all pages have a version 1 at the beginning) If the geographic database 109 on the server is now incrementally changed, the relational database tries to store the new data in such a way that as many pages as possible stay untouched. For example, as shown in FIG. 1D, the newly updated data 129 is partly stored on page 4 and partly on page 4723 (e.g., because the data is too big for page 4). Accordingly, the versions for page 4 and page 4723 are updated accordingly. In this way, if a client application 115 tries to update its local geographic database 113, the application 115 only has to exchange the two pages 4 and 4722.

Figure 1E:
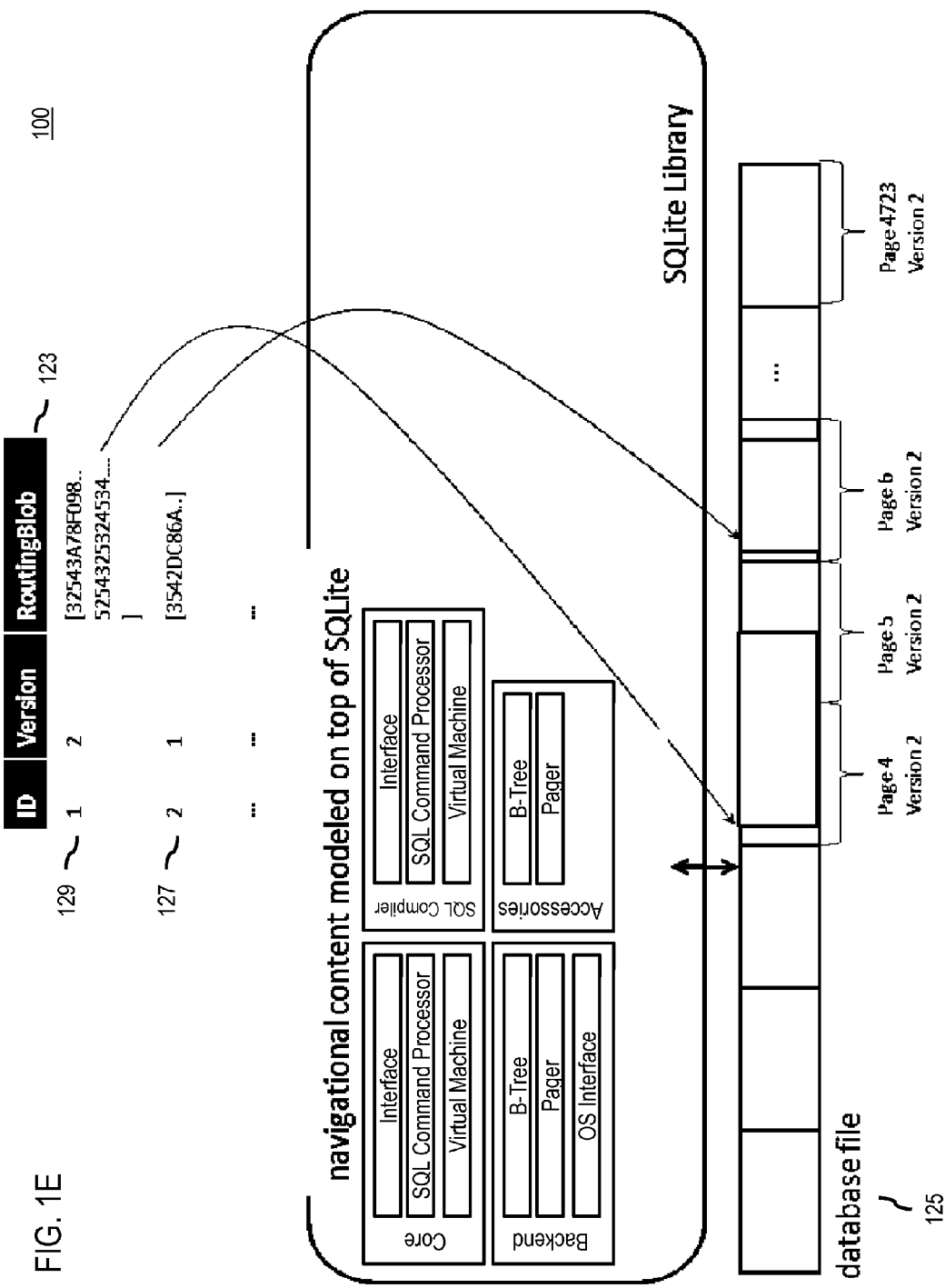
FIG. 1E is a diagram illustrating a mapping of relational content to database pages after a full update, according to one embodiment.

However, there are shortcomings to the paged approach described above. For example, as shown in FIG. 1E, if the database file 125 is updated by a full recompilation rather than incrementally, then the newly updated data 129 is stored on two consecutive pages 4 and 5 rather split across page 4 and page 4732 as shown in FIG. 1D. Storing the new data 129 in two consecutive pages, however, causes all of the subsequent data in the database file 125 to be stored on different pages. Thus, all pages would have to be updated on the from the server side geographic database 109 to the client side geographic database 113, resulting in a significant update size and associated resource burden.

In one embodiment, another way to compute a generic update package independently of the page structure is to apply a binary difference approach (binary diff) between the old database file and the new database file. By way of example, such an update package can be computed on the server (e.g., the service 107) and applied to the target client (e.g., the UE 101) by standard binary diff programs (e.g., BSDIFF).

For example, if a comparison is made of the database file 125 of FIG. 1C and the database file 125 of FIG. 1D, standard binary diff algorithms would compute a small binary difference. For example, the size of the computed binary difference would be similar in size (or even smaller) to the two changed pages that have to be updated. Furthermore, a comparison of the database file 125 of FIG. 1D and the database file 125 of FIG. 1E, the computed binary difference would again be small (e.g., probably less than one page). Standard binary diff algorithms work very well if the content within the file is shifted (e.g., by one page).

In one embodiment, if the binary difference is computed on the server side, the update process on the UE 101 works as follows. First, the complete update package is downloaded to the UE 101 and stored in secondary storage. Thereafter, the complete update package is merged with the old geographic database 113 on the UE 101. Traditionally, the geographic database 113 on the UE 101 cannot be used during this merging process. Only after the complete binary diff file is incorporated into the geographic database 113 on the UE 101 will the updated geographic database 113 be ready for use. In addition, the main memory requirement and runtime requirements can be high on the UE 101 so that the requirements are often higher than the resources available in most current embedded devices (e.g., the UE 101).

To address at least these challenges, the system 100 introduces a capability to provide incremental database updates based on determining the differences or delta (e.g., using binary diff) on a page-by-page basis to construct a database update package via an update platform 131 on the server side and/or an update manager 133 on the client side. More specifically, in one embodiment, the system 100 can generate difference patches (e.g., binary diff patches) which contain, for a new page $P_i$, a reference page $P_j$ and a binary diff that allows transforming the page $P_j$ into page $P_i$.

In one embodiment, the system 100 has two databases $DB_{old}$ and $DB_{new}$ where $DB_{new}$ consists of $n_{new}$ pages (e.g., new page $P_i$) and $DB_{old}$ of $n_{old}$ pages (e.g., a reference page $P_j$). In one embodiment, the system 100 computes the minimal binary diff patch $p_{i\_patch}$ for each new database page $P_i$. For example, the system 100 computes for each new database page $P_i$ where $1<=i<=n_{new}$ all binary diff patches $p_{i\_j}$ where $1<=j<=n_{old}$ and take the smallest one, i.e. $p_{i\_patch}=$ min $\{p_{i\_j} | 1<=j<=n_{old}\}$ as update package for page $P_i$.

In one embodiment, the system 100 limits the approach of iterating over all pages $1<=j<=n_{old}$ to those pages which contain data of the same tables as page $P_i$.

In another embodiment, the system 100 limits the iterating over all pages $1<=j<=n_{old}$ to those pages which have a certain maximum distance $max_{dist}$ from the best last fitting page. By way of example, the system 100 computes the best fitting reference page $P_{i\_min\_j}$ by iterating over a similarity index on the old pages. In other words, instead of comparing the new page to all pages of the old database, the system 100 can consult a similarity index that enables random access to those pages that are likely to be similar (e.g., best last fitting page) to the new page based on characteristics (e.g., data type, table structure, etc.) of the old pages. In one embodiment, the system 100 can select the most similar or best fitting page as a starting point for iterating to find the minimal diff patches. Then, the system 100 can select the $max_{dist}$ (e.g., the distance in number of pages or index values away from the starting or best fitting page) that it will iterate over. In this way, for instance, the system 100 can limit its iteration over a subset of of pages (e.g., $P_{i\_min\_j} \pm max_{dist}$) to reduce the resource burden association with the iterative process. This embodiment of the maximum distance approach is, for instance, based on the premise that the minimal diff patch is likely to be found near an old page (e.g., best fitting page) that is most similar to the new page. Therefore, any differences in the size of the minimal diff patch generated by full iterative process and the maximum distance process can be itself be minimized.

In one embodiment, the system 100 computes a binary diff patch $p_{i\_patch}$ for each new database page $P_i$ by carrying out a binary diff between the new page $P_i$ and the old database file $DB_{old}$. Then, in one embodiment, the system 100 can define a database update package UP as a set of binary diff patches $p_{i\_patch}$ for each new page $P_i$, i.e. UP=$\{p_{i\_patch} | 1<=i<=n_{new}\}$. In one embodiment, the update package for a new page $P_i$ can be computed by a binary diff between this new page $P_i$ and several pages of the old database file $DB_{old}$.

In one embodiment, after generating an update package, the system 100 transmits the complete update package from the server (e.g., the service 107) to the client (e.g., the update manager 133). In one embodiment, the update manager 133 can construct the new database pages $P_i$ when they are read/required for the first time, based on the binary diff patch $p_{i\_patch}$ and the old database file $DB_{old}$ already available at the client. After construction, the update manager 133 transfers the new page to the caller (e.g., the database management system). In one embodiment, the update manager 133 can store the new page permanently in the updated client side geographic database 113 so that the new page can be used for subsequent calls. In one embodiment, the update manager 133 does not overwrite the old or reference pages until the update manager 133 verifies that the old pages are not needed as the basis for other difference patches for constructing other new pages.

In one example use case, the system 100 computes on the server (e.g., via the update platform 131) an update package which consists, for each new page $P_i$ where $1<=i<=n_{new}$, of a binary diff to the most similar page $P_j$ where $1<=j<=n_{old}$ in the old database. When computing the update package for the new database file 125 in FIG. 1E compared to the old database file 125 in FIG. 1C, the update packages would be very small as each new page $P_i$ where $i>=6$ would be described by a binary diff based on the old page $P_j$ where $j=i-1$. In these cases, the binary diff would be non-existent. Thus the various embodiments of the approach described herein leads to small update packages even if the system 100 does a full recompilation of the server side geographic database 109.

In one embodiment, when a client application 115 has downloaded the update package, the client application 115 can immediately start working with the data. The database system always reads the data page-wise. For example, if the system wants to read the new page $P_i$, then, in the update package, it might be described that the new page $P_i$ can be reconstructed by applying a binary diff patch $p_i(P_j)$ to the old page $P_j$. The new page $P_i$ can then be constructed on the fly during the first request from the database management system. Thereafter, it is stored in the new database $DB_{new}$ (e.g., the updated client side geographic database 113). In this case, for all subsequent reads of the new page $P_i$, no merging is necessary (e.g., the already constructed page $P_i$ can directly be passed to the database management system or caller). The advantage of this approach is that the database is ready-to-use right after the update package is downloaded. In one embodiment, there is no need for merging the complete update package with the old database (e.g., the geographic database 113) before the first page can be read from the database management system. Thus, the overall time until a new or updated database is available for the end user, e.g. navigation system, is reduced. Furthermore, the required memory is limited to 2 pages, which is typically several orders of magnitude less than the main memory required for traditional binary diff approaches acting on the entire databases 109 and 113.

By way of example, the communication network 105 of system 100 includes one or more networks such as a data network, a wireless network, a telephony network, or any combination thereof. It is contemplated that the data network may be any local area network (LAN), metropolitan area network (MAN), wide area network (WAN), a public data network (e.g., the Internet), short range wireless network, or any other suitable packet-switched network, such as a commercially owned, proprietary packet-switched network, e.g., a proprietary cable or fiber-optic network, and the like, or any combination thereof. In addition, the wireless network may be, for example, a cellular network and may employ various technologies including enhanced data rates for global evolution (EDGE), general packet radio service (GPRS), global system for mobile communications (GSM), Internet protocol multimedia subsystem (IMS), universal mobile telecommunications system (UMTS), etc., as well as any other suitable wireless medium, e.g., worldwide interoperability for microwave access (WiMAX), Long Term Evolution (LTE) networks, code division multiple access (CDMA), wideband code division multiple access (WCDMA), wireless fidelity (WiFi), wireless LAN (WLAN), Bluetooth®, near field communication (NFC), Internet Protocol (IP) data casting, digital radio/television broadcasting, satellite, mobile ad-hoc network (MANET), and the like, or any combination thereof.

The UE 101 is any type of mobile terminal, fixed terminal, or portable terminal including a mobile handset, car head unit, station, unit, device, mobile communication device, multimedia computer, multimedia tablet, Internet node, communicator, desktop computer, laptop computer, notebook computer, netbook computer, tablet computer, personal communication system (PCS) device, personal navigation device, personal digital assistants (PDAs), audio/video player, digital camera/camcorder, positioning device, television receiver, radio broadcast receiver, electronic book device, game device, or any combination thereof, including the accessories and peripherals of these devices, or any combination thereof. It is also contemplated that the UE 101 can support any type of interface to the user (such as "wearable" circuitry, etc.).

By way of example, the UE 101, services platform 103, services 107, content providers 111, applications 115, update platform 131, and the update manager 133 with each other and other components of the communication network 105 using well known, new or still developing protocols. In this context, a protocol includes a set of rules defining how the network nodes within the communication network 105 interact with each other based on information sent over the communication links. The protocols are effective at different layers of operation within each node, from generating and receiving physical signals of various types, to selecting a link for transferring those signals, to the format of information indicated by those signals, to identifying which software application executing on a computer system sends or receives the information. The conceptually different layers of protocols for exchanging information over a network are described in the Open Systems Interconnection (OSI) Reference Model.

Communications between the network nodes are typically effected by exchanging discrete packets of data. Each packet typically comprises (1) header information associated with a particular protocol, and (2) payload information that follows the header information and contains information that may be processed independently of that particular protocol. In some protocols, the packet includes (3) trailer information following the payload and indicating the end of the payload information. The header includes information such as the source of the packet, its destination, the length of the payload, and other properties used by the protocol. Often, the data in the payload for the particular protocol includes a header and payload for a different protocol associated with a different, higher layer of the OSI Reference Model. The header for a particular protocol typically indicates a type for the next protocol contained in its payload. The higher layer protocol is said to be encapsulated in the lower layer protocol. The headers included in a packet traversing multiple heterogeneous networks, such as the Internet, typically include a physical (layer 1) header, a data-link (layer 2) header, an internetwork (layer 3) header and a transport (layer 4) header, and various application (layer 5, layer 6 and layer 7) headers as defined by the OSI Reference Model.

In one embodiment, the applications 115 and the services 107; and the update manager 133 and the update platform 131 can interact according to a client-server model, for example. It is noted that the client-server model of computer process interaction is widely known and used. According to the client-server model, a client process sends a message including a request to a server process, and the server process responds by providing a service. The server process can also return a message with a response to the client process. Often the client process and server process execute on different computer devices, called hosts, and communicate via a network using one or more protocols for network communications. The term "server" is conventionally used to refer to the process that provides the service, or the host computer on which the process operates. Similarly, the term "client" is conventionally used to refer to the process that makes the request, or the host computer on which the process operates. As used herein, the terms "client" and "server" refer to the processes, rather than the host computers, unless otherwise clear from the context. In addition, the process performed by a server can be broken up to run as multiple processes on multiple hosts (sometimes called tiers) for reasons that include reliability, scalability, and redundancy, among others.

Figure 1F:
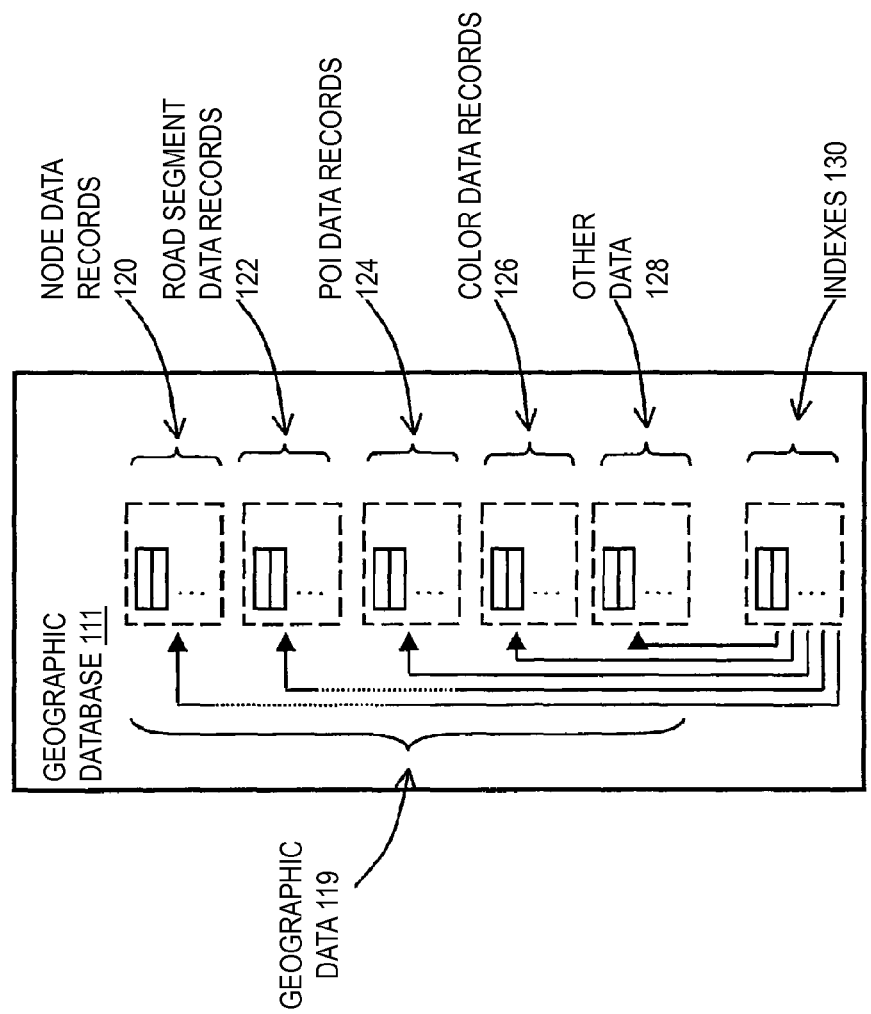
FIG. 1F is a diagram of a geographic database, such as can be included in the system of FIG. 1A, according to one embodiment.

FIG. 1F is a diagram of geographic databases 109 and 113 of system 100, according to exemplary embodiments. In the exemplary embodiments, mapping data can be stored, associated with, and/or linked to the geographic databases 109 and 113. In one embodiment, the geographic database 109/113 includes geographic data 141 used for (or configured to be compiled to be used for) mapping and/or navigation-related services, such as for personalized route determination, according to exemplary embodiments. For example, the geographic database 109/113 includes node data records 143, road segment or link data records 145, POI data records 147, event data records 149, and other data records 151. More, fewer or different data records can be provided. In one embodiment, the other data records 151 include cartographic ("carto") data records, routing data, and maneuver data. One or more portions, components, areas, layers, features, text, and/or symbols of the POI or event data can be stored in, linked to, and/or associated with one or more of these data records. For example, one or more portions of the POI, event data, or recorded route information can be matched with respective map or geographic records via position or GPS data associations (such as using known or future map matching or geo-coding techniques), for example.

In exemplary embodiments, the road segment data records 145 are links or segments representing roads, streets, or paths, as can be used in the calculated route or recorded route information for determination of one or more personalized routes, according to exemplary embodiments. The node data records 143 are end points corresponding to the respective links or segments of the road segment data records 145. The road link data records 145 and the node data records 143 represent a road network, such as used by vehicles, cars, and/or other entities. Alternatively, the geographic database 109/113 can contain path segment and node data records or other data that represent pedestrian paths or areas in addition to or instead of the vehicle road record data, for example.

The road/link segments and nodes can be associated with attributes, such as geographic coordinates, street names, address ranges, speed limits, turn restrictions at intersections, and other navigation related attributes, as well as POIs, such as gasoline stations, hotels, restaurants, museums, stadiums, offices, automobile dealerships, auto repair shops, buildings, stores, parks, etc. The geographic database 109/113 can include data about the POIs and their respective locations in the POI data records 147. The geographic database 109/113 can also include data about places, such as cities, towns, or other communities, and other geographic features, such as bodies of water, mountain ranges, etc. Such place or feature data can be part of the POI data 147 or can be associated with POIs or POI data records 147 (such as a data point used for displaying or representing a position of a city). In addition, the geographic database 109/113 can include event data (e.g., traffic incidents, constructions, scheduled events, unscheduled events, etc.) associated with the POI data records 147 or other records of the geographic database 109/113.

The geographic database 109/113 can be maintained by the content provider in association with the services platform 103 and/or content provider 111 (e.g., a map developer). The map developer can collect geographic data to generate and enhance the geographic database 109/113. There can be different ways used by the map developer to collect data. These ways can include obtaining data from other sources, such as municipalities or respective geographic authorities. In addition, the map developer can employ field personnel to travel by vehicle along roads throughout the geographic region to observe features and/or record information about them, for example. Also, remote sensing, such as aerial or satellite photography, can be used.

The geographic database 109/113 can be a master geographic database stored in a format that facilitates updating, maintenance, and development. For example, the master geographic database 109/113 or data in the master geographic database 109/113 can be in an Oracle spatial format or other spatial format, such as for development or production purposes. The Oracle spatial format or development/production database can be compiled into a delivery format, such as a geographic data files (GDF) format. The data in the production and/or delivery formats can be compiled or further compiled to form geographic database products or databases, which can be used in end user navigation devices or systems.

For example, geographic data is compiled (such as into a platform specification format (PSF) format) to organize and/or configure the data for performing navigation-related functions and/or services, such as route calculation, route guidance, map display, speed calculation, distance and travel time functions, and other functions, by a navigation device, such as by a UE 101, for example. The navigation-related functions can correspond to vehicle navigation, pedestrian navigation, or other types of navigation. The compilation to produce the end user databases can be performed by a party or entity separate from the map developer. For example, a customer of the map developer, such as a navigation device developer or other end user device developer, can perform compilation on a received geographic database in a delivery format to produce one or more compiled navigation databases.

As mentioned above, the server side geographic database 109 can be a master geographic database, but in alternate embodiments, the client side geographic database 113 can represent a compiled navigation database that can be used in or with end user devices (e.g., UEs 101) to provide navigation-related functions. For example, the geographic database 113 can be used with the end user device 101 to provide an end user with navigation features. In such a case, the geographic database 113 can be downloaded or stored on the end user device UE 101, such as in applications 115, or the end user device UE 101 can access the geographic database 109 and/or 113 through a wireless or wired connection (such as via a server and/or the communication network 105), for example.

In one embodiment, the end user device or UE 101 can be an in-vehicle navigation system, a personal navigation device (PND), a portable navigation device, a cellular telephone, a mobile phone, a personal digital assistant (PDA), a watch, a camera, a computer, and/or other device that can perform navigation-related functions, such as digital routing and map display. In one embodiment, the navigation device UE 101 can be a cellular telephone. An end user can use the device UE 101 for navigation functions such as guidance and map display, for example, and for determination of one or more personalized routes or route segments based on one or more calculated and recorded routes, according to exemplary embodiments.

Figure 2:
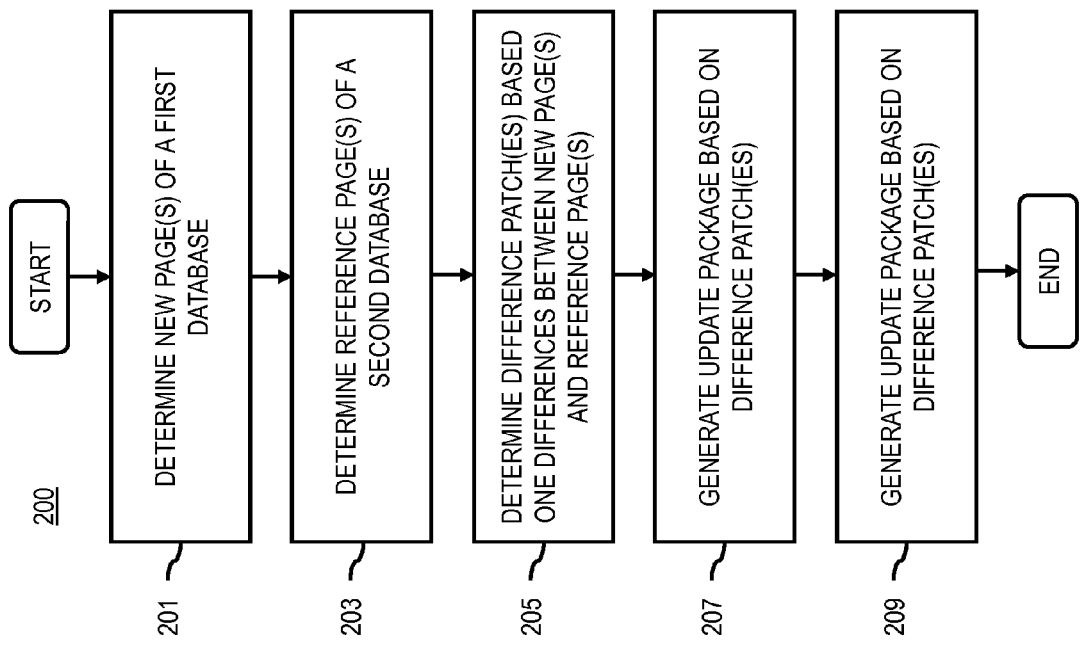
FIG. 2 is a flowchart of a process of providing incremental database updates based on delta pages, according to one embodiment.
Figure 8:
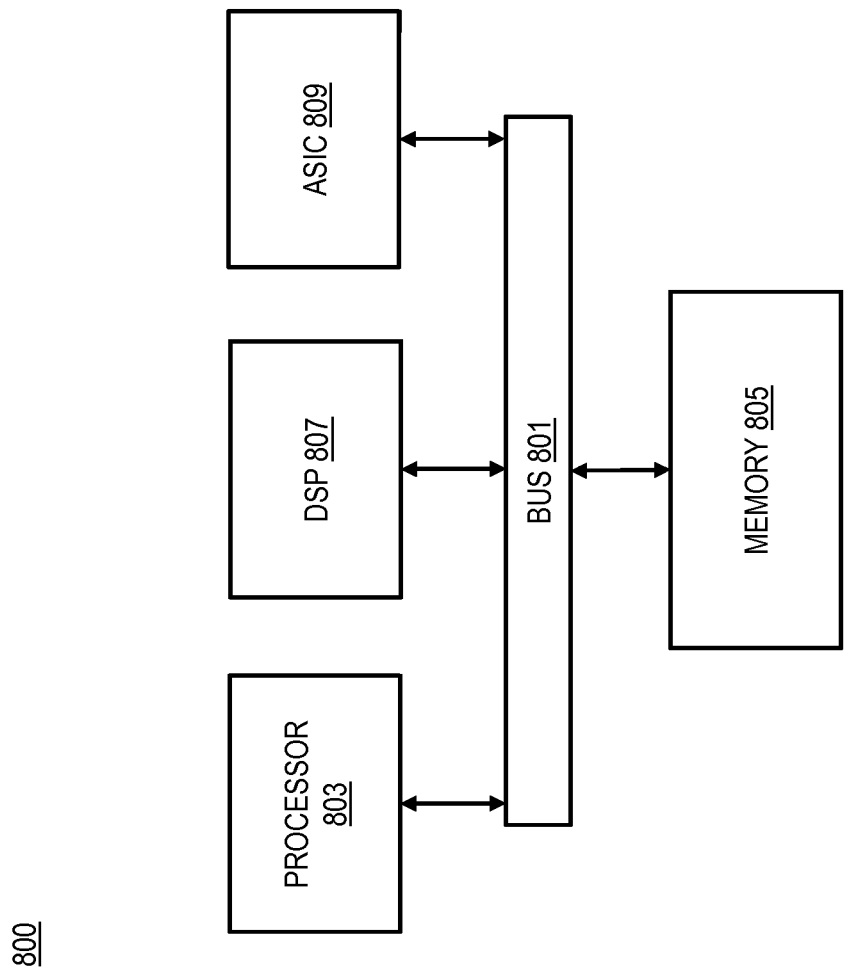
FIG. 8 is a diagram of a chip set that can be used to implement an embodiment of the invention.

FIG. 2 is a flowchart of a process of providing incremental database updates based on delta pages, according to one embodiment. In one embodiment, the update platform 131 and/or the update manager 133 perform all or a portion of the process 200 and are implemented in, for instance, a chip set including a processor and a memory as shown in FIG. 8. As such, the update platform 131 and/or the update manager 133 can provide means for accomplishing various parts of the process 200 as well as means for accomplishing other processes in conjunction with other components of the system 100.

In step 201, the update platform 131 determines at least one new page of a first database (e.g., a new database or a newer version of a database). For example, the update platform 131 determines there is a new database $DB^{new}$ consisting of $n^{new}$ pages $P_i^{new}$, i.e. $DB^{new}=\{P_i^{new}|1<=i<=n^{new}\}$. In one embodiment, this database has been created by incrementally changing an old database or by a full recompilation. In one embodiment, this new database is available on the server (e.g., service 107) as, for instance, an updated version of the server side geographic database 109.

In step 203, the update platform 131 determines at least one reference page of a second database. For example, the update platform 131 determines that there is an old $DB^{old}$ consisting of $n^{old}$ pages $P_j^{pld}$, i.e. $DB^{new}=\{P_j^{new}|1<=j<=n^{old}\}$. In one embodiment, this old database is stored on the client (e.g., the UE 101) as the client side geographic database 113 that is not up-to-date.

In step 205, the update platform 131 process and/or facilitate a processing of the at least one new page and the at least one reference page to determine at least one difference patch comprising one or more differences between the at least one new page and the at least one reference page. In one embodiment, the at least one new page can be constructed from the at least one reference page and the at least one difference patch. By way of example, the update platform 131 computes for all new pages $P_i^{new}$ and all old pages $P_j^{old}$ the binary diff patches $p_{ij}$, i.e. $\{p_{ij}|1<=i<=n^{new}, 1<=j<=n^{old}: p_{ij}=A_{bd}(P_i^{new}, P_j^{old})\}$. In one embodiment, the minimum of these patches $p_{ij}$ is then the update patch for page $P_i^{new}$. Based on such patches $p_{ij}$ and the old page $P_j^{old}$, it is possible to create a new page $P_i^{new}$ by applying a binary merge Algorithm $A_{md}$, i.e. $P_i^{new}=A_{md}(p_{ij}, P_j^{old})$. In one embodiment, a binary merge algorithm such as bspatch could be used, if bsdiff was used for computing the patches.

In step 207, the update platform 131 causes, at least in part, a generation of at least one update package comprising the at least one difference patch and an index to the at least one reference page. In one embodiment, an update package for the new page $P_i^{new}$ could consist of a tuple $(p_{i\_min}, i\_min\_j)$, where i_min_j means the index of the reference page in the old database file which should be used together with the patch $p_{i\_min}$ for reconstructing page $P_i^{new}$. For example, such a tuple could be described in a formal binary language, e.g. in relational datascript as used in NDS (navigation database standard). In one embodiment, the complete update package for a new database $DB^{new}$ with respect to an old database $DB^{old}$ could then simply be described as follows: $UP(DB^{new}, DB^{old})=\{(p_{i\_min}, i\_min\_j)|1<=i<=n^{new}\}$.

In other words, in one embodiment, the update platform 131 can perform a binary diff between the new database file and the old database file. For example, the update platform 131 can divide the new database file consisting of $n^{new}$ pages $P_i^{new}$ into $n^{new}$ files $f_i^{new}$, where $1<=i+1<=n^{new}$, i.e. each new page is regarded as a new file. Next, the update platform 131 can carry out a binary diff between each new file $f_i^{new}$ and the old database file $DB^{old}$. In one embodiment, each of the resulting binary diff packages is regarded as a page update package. For example, such a page update package does not consist of a single reference page of the old file and some delta operations, but can consist of several references to (parts of) several old pages.

In step 209, the update platform 131 causes, at least in part, a transmission of the at least one update package to a device associated with the second database. For example, the transmission of the update package can be performed periodically, according to a schedule, on demand, etc.

Figure 3:
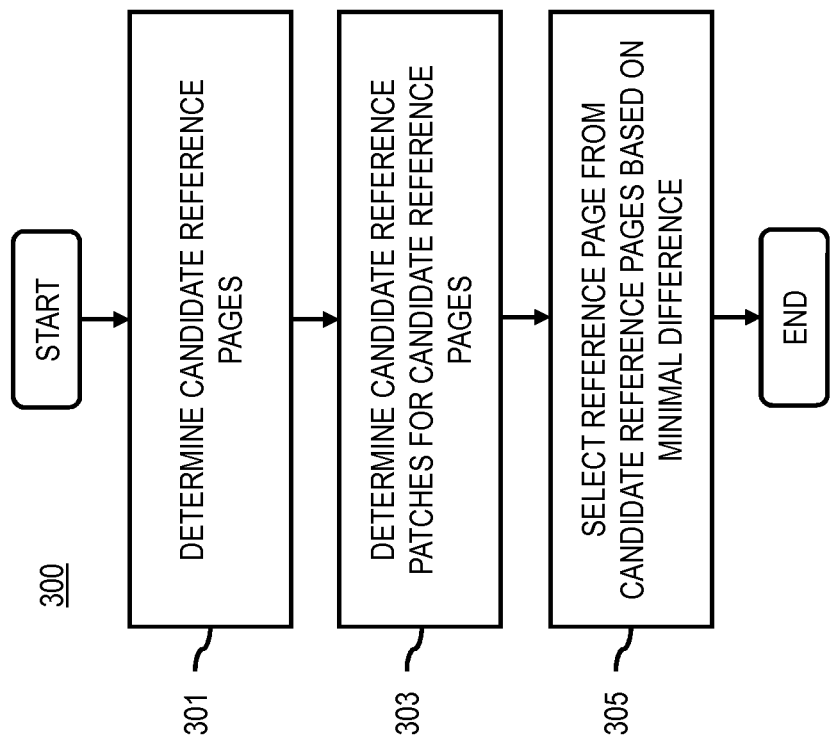
FIG. 3 is a flowchart of a process for computing minimal difference patches for new database page, according to one embodiment.

FIG. 3 is a flowchart of a process for computing minimal difference patches for new database page, according to one embodiment. In one embodiment, the update platform 131 and/or the update manager 133 perform all or a portion of the process 300 and are implemented in, for instance, a chip set including a processor and a memory as shown in FIG. 8. As such, the update platform 131 and/or the update manager 133 can provide means for accomplishing various parts of the process 300 as well as means for accomplishing other processes in conjunction with other components of the system 100.

In step 301, the update platform 131 determines one or more candidate reference pages (e.g., old pages) of the second database (e.g., the old database). For example, in one embodiment, both $DB^{old}$ and $DB^{new}$ are available. The update platform 131 first compute for each new page the "most similar" old page. Similarity in this context means that the update platform 131 looks for the page for which the binary difference is minimal. For example, the binary difference can be determined using a binary diff Algorithm $A_{bd}$, e.g. bsdiff.

In one embodiment, the update platform 131 is not interested in all patches $p_{ij}$, but only in the smallest ones. Accordingly, in step 303, the update platform 131 determines one or more candidate difference patches for the one or more candidate reference pages. In step 305, the update platform causes, at least in part, a selection of the at least one reference page from among the one or more candidate reference pages based, at least in part, on a minimal difference criteria for the one or more candidate difference patches.

In one embodiment, the update platform 131 defines for each new page $P_i^{new}$ the smallest patch $p_{i\_patch}$ as follows: $p_{i\_patch} = \min\{p_{ij} | 1 <= j <= n^{old} : p_{ij} = A_{bd}(P_i^{new}, P_j^{old})\}$. Likewise, the update platform 131 defines for each new page $P_i^{new}$ the minimum "old" reference page $P_{i\_min\_j}^{old}$ if $p_{i\_min} = A_{bd}(P_i^{new}, P_{i\_min\_j}^{old})$. In one embodiment, because old pages are stored at the client (e.g., the client side geographic database 113 of the UE 101), the update platform uses the reference i_min_j to refer to the minimum old page on the target. i_min_j describes that the old page $P_j^{old}$ should be used to create the new page $P_i^{new}$.

Figure 4:
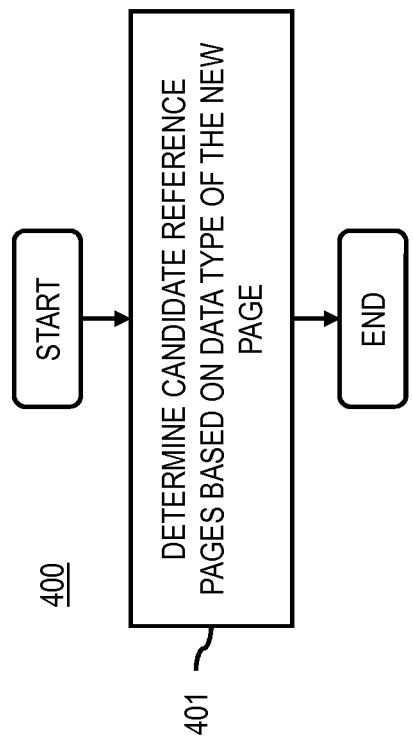
FIG. 4 is a flowchart of a process for limiting candidate reference pages based on data type, according to one embodiment.

FIG. 4 is a flowchart of a process for limiting candidate reference pages based on data type, according to one embodiment. In one embodiment, the update platform 131 and/or the update manager 133 perform all or a portion of the process 400 and are implemented in, for instance, a chip set including a processor and a memory as shown in FIG. 8. As such, the update platform 131 and/or the update manager 133 can provide means for accomplishing various parts of the process 400 as well as means for accomplishing other processes in conjunction with other components of the system 100.

In some embodiments, the update platform 131 can one or more optional optimizations which can help limit the number of reference pages which the update platform 131 has to evaluate to generate an update package. In this way, the update platform 131 can minimize the resource burden associated with generating the update package.

In step 401, the update platform 131 determines the one or more candidate reference pages based, at least in part, on a data type associated with the at least one new page. In other words, to reduce the runtime complexity for the computation of the update package, the update platform 131 can limit the number of page comparisons to those pages that actually store the content of the same tables or same data types. In one embodiment, a navigation database, for instance in the NDS format, contains several tables, e.g. one for routing, one for map display, several for POIs, etc. In addition, the database contains indices.

For example, SQLite, the underlying database of NDS, never stores data from different tables or indices on the same page. Furthermore, SQLite stores in a data dictionary information about which pages are used by which tables or indices. For example, SQLite stores only the first page used by the table or index, but all other pages used by this table or index can be found from this starting page by walking through the concatenated list of pages. As a result, for a new page $P_i^{new}$ it is likely that the best possible old reference page $P_{i\_min\_j}^{old}$ is likely to contain data from the same table or index (e.g., of a same or similar data type). Therefore, the update platform 131 can limit the finding of the best reference page to those pages that belong to the same table or index as the data in the new page. This limitation can lead to a considerable speed-up during the compilation of the update package and is unlikely to produce bigger update packages.

Figure 5:
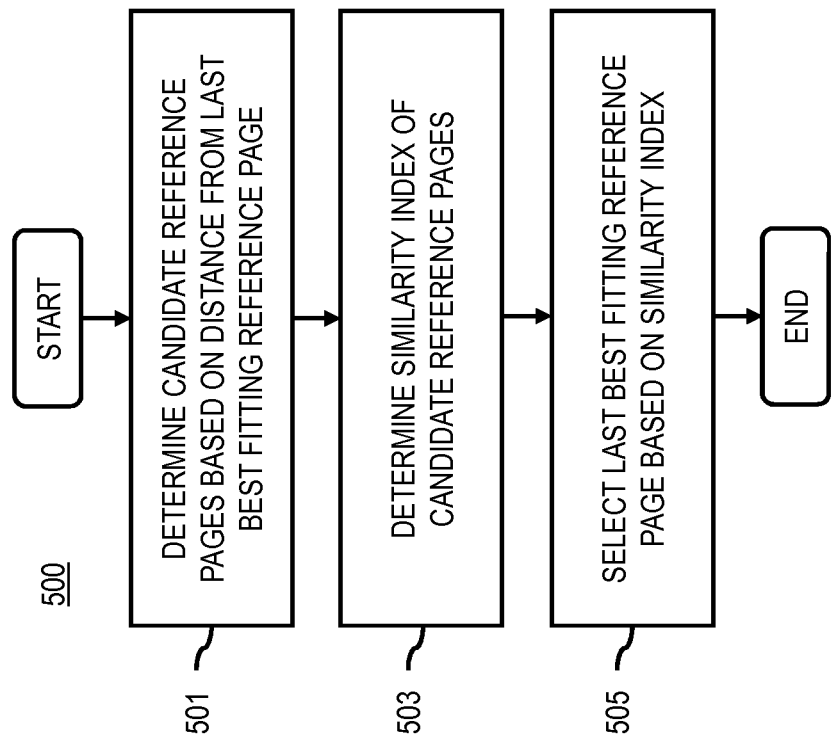
FIG. 5 is a flowchart of a process for limiting candidate reference pages based on distance for a last best fitting reference page, according to one embodiment.

FIG. 5 is a flowchart of a process for limiting candidate reference pages based on distance for a last best fitting reference page, according to one embodiment. In one embodiment, the update platform 131 and/or the update manager 133 perform all or a portion of the process 500 and are implemented in, for instance, a chip set including a processor and a memory as shown in FIG. 8. As such, the update platform 131 and/or the update manager 133 can provide means for accomplishing various parts of the process 500 as well as means for accomplishing other processes in conjunction with other components of the system 100.

In step 501, the update platform 131 determines a similarity index of the one or more candidate reference pages. In step 503, the update platform 131 causes, at least in part, a selection of the at least one last best fitting reference page from among the one or more candidate reference pages based, at least in part, on the similarity index. In one embodiment, to reduce the complexity for computing the best fitting pages from $O(n^{new}*n^{old})$ the update platform 131 organizes the $n^{old}$ pages from the old database file in a metric index-structure (e.g., a relational M-tree) reflecting the similarity of the old or reference pages. In one embodiment, as a metric distance measure for the pages, the update platform 131 can use the size of the binary diffs between the two pages. Note that in this case, the update platform 131 can compute binary differences between the pages of the old database file without using the new database file at all. In one embodiment, the index creation has a runtime complexity of $O(n^{old}*\log n^{old})$. In one embodiment, for each page of the new database file, the update platform 131 can traverse the metric or similarity index in order to find the best-fitting old page. In one embodiment, the runtime complexity for doing this for all new pages is $O(n^{new}*\log n^{old})$.

Thus the overall runtime complexity of this approach is $O((n^{old}+n^{new})*\log n^{old})$ whereas the complexity of the approach without using the index is $O(n^{old}*n^{new})$. Accordingly, for large database files containing up to a million pages, the various embodiments of the approach described herein can be many orders of magnitude faster than the approach without the index.

In step 505, the update platform 131 determines the one or more candidate reference pages based, at least in part, on a distance threshold from at least one last best fitting reference page. In this embodiment, the update platform 131 is assumed to be looking at a page $P_{i+1}^{new}$, where $1<=i+1<=n^{new}$. Furthermore, it is assumed that the update platform 131 has already computed the update package for page $P_i^{new}$, consisting of a tuple ($p_{i\_min}$, i_min_j). In this case the best fitting page for $P_i^{new}$ was $P_{i\_min}^{old}$. Accordingly, it can be likely that the best fitting page for $P_{i+1}^{new}$ is somehow close to the page $P_{i\_min}^{old}$. Thus, in one embodiment, when computing the reference page for $P_{i+1}^{new}$, the update platform 131 need only look at pages $P_j^{old}$ where i_min−T<=j<=i_min+T. T is a threshold parameter which defines the number of pages we examine around the last best fitting page $P_{i\_min}^{old}$. The overall runtime complexity of this approach is $O(T*n^{new})$.

Figure 6:
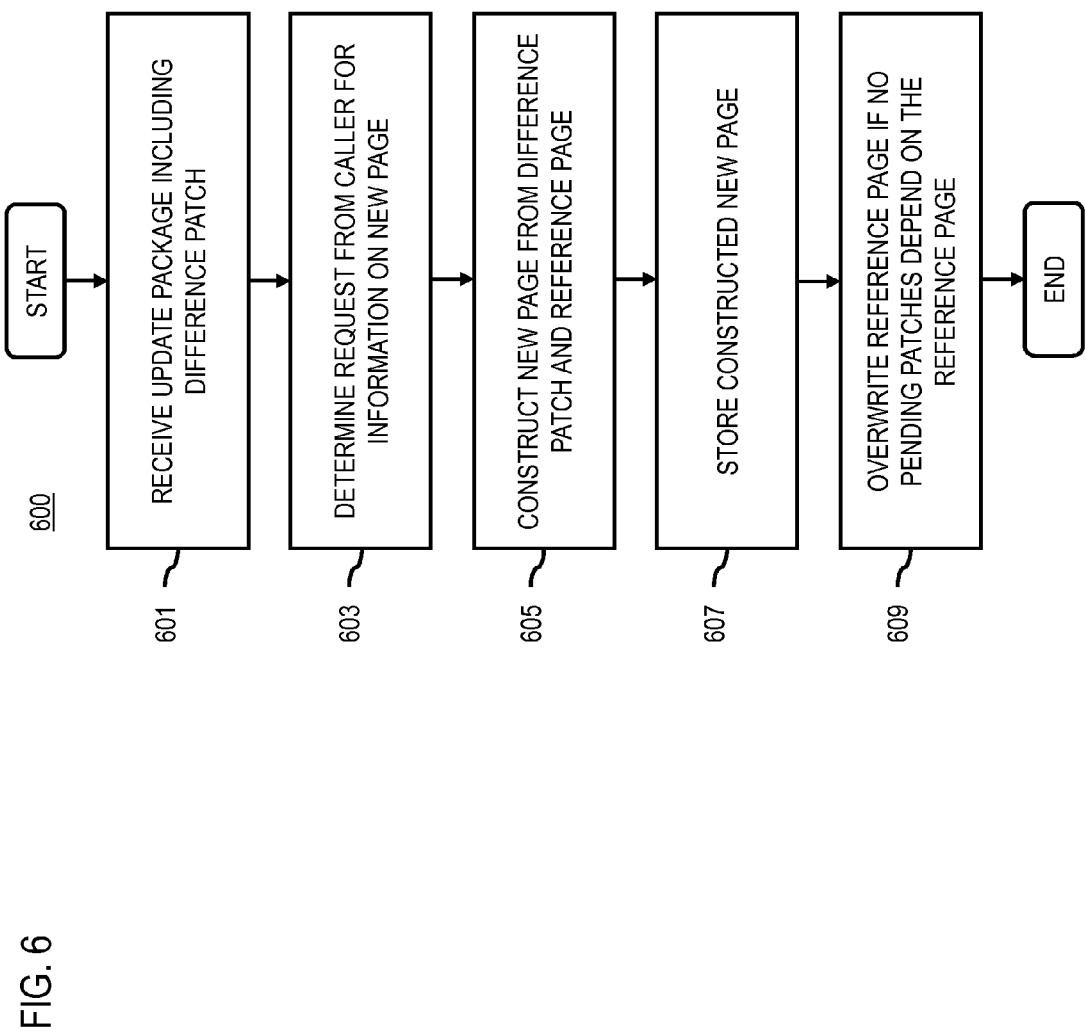
FIG. 6 is a flowchart of a client side process for providing incremental database updates based on delta pages, according to one embodiment.

FIG. 6 is a flowchart of a client side process for providing incremental database updates based on delta pages, according to one embodiment. In one embodiment, the update manager 133 and/or the update platform 131 perform all or a portion of the process 600 and are implemented in, for instance, a chip set including a processor and a memory as shown in FIG. 8. As such, the update manager 133 and/or the update platform 131 can provide means for accomplishing various parts of the process 600 as well as means for accomplishing other processes in conjunction with other components of the system 100.

In step 601, the update manager 133 receive at least one update package at a device. In one embodiment, the at least one update package comprises at least one difference patch based, at least in part, on one or more differences between at least one new page of a first database and at least one reference page of a second database associated with the device. By way of example, the at least one new page can be constructed from the at least one reference page and the at least one difference patch. After the update manager 133 receives and stores the package on the client side, the client can start using the new data.

For example, in step 603, the update manager 133 determines a request from at least one caller for information associated with the at least one new page. In one embodiment, the request is initiated each time an application 115 reads a page from the database file (e.g., the geographic database 113). In response, a low level file access layer of the database system (e.g., a virtual file system from SQLite) checks whether the new database page (e.g., received in the update package) has already been computed before and sored in the local geographic database 113. If yes, the database system simply takes the page and returns it to the caller.

If no, in step 605, the update manager 133 causes, at least in part, a construction of the at least one new page from the at least one reference page and the at least one difference patch in response to the request. For example, the update manager 133 looks for the update package for the requested page and then computes the new requested page on the fly out of the update package and the old database file. The update manager 133 then causes, at least in part, a return of the at least one new page to the at least one caller.

In step 607, the update manager 133 causes, at least in part, a storage of the at least one new page in the second database for responding to one or more subsequent calls for the at least one new page. In one embodiment, the newly computed page is stored at the right position in the new database file.

In step 609, the update manager 133 causes, at least in part, an overwriting of the at least one reference page based, at least on part, on a determination of whether the at least one difference patch, one or more other pending difference patches, or a combination thereof depend on the at least one reference page. In one embodiment, in a parallel low-priority thread, the update manager 133 or database system can use idle times of the UE 101 to create new pages out of the old database file and the new update packages. After the new database file has been created completely, the old database file can be deleted.

The processes described herein for providing incremental database updates based on delta pages may be advantageously implemented via software, hardware, firmware or a combination of software and/or firmware and/or hardware. For example, the processes described herein, may be advantageously implemented via processor(s), Digital Signal Processing (DSP) chip, an Application Specific Integrated Circuit (ASIC), Field Programmable Gate Arrays (FPGAs), etc. Such exemplary hardware for performing the described functions is detailed below.

Figure 7:
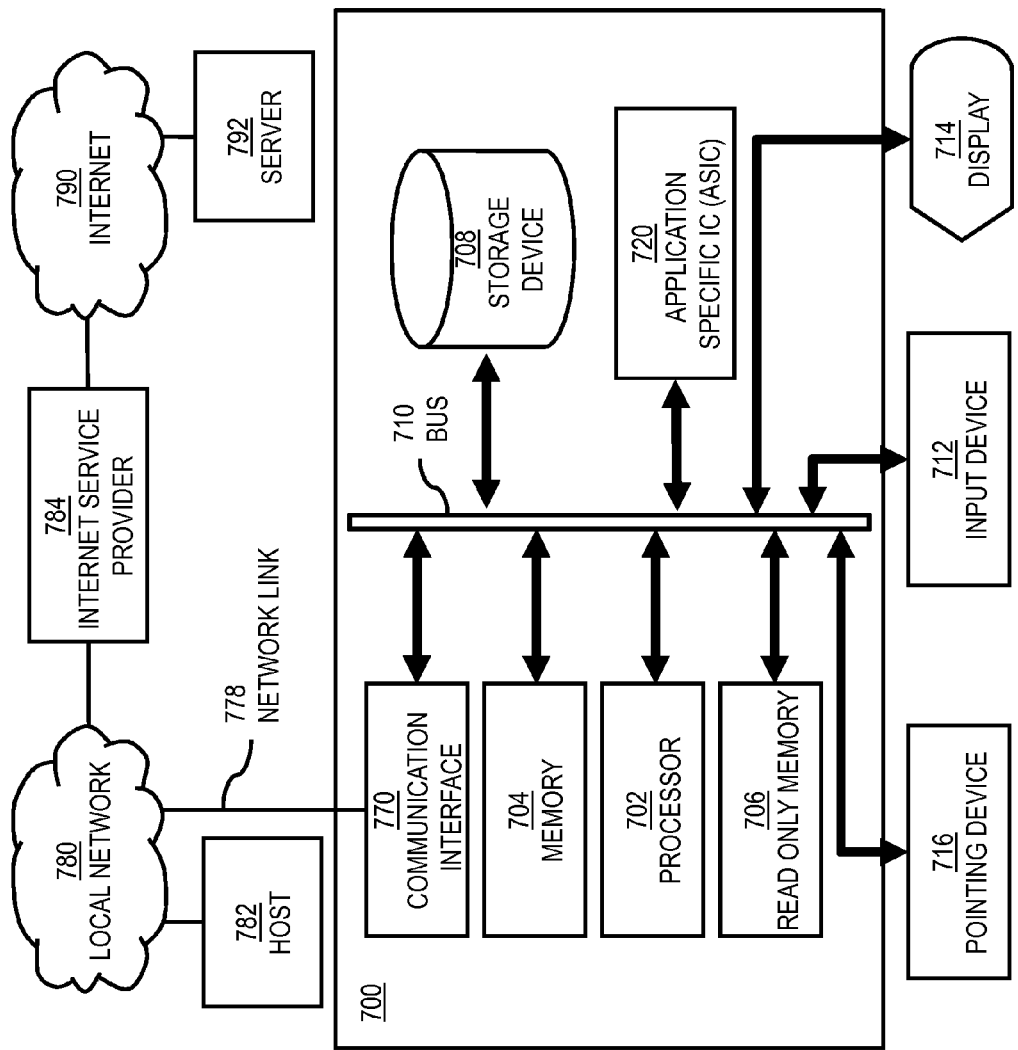
FIG. 7 is a diagram of hardware that can be used to implement an embodiment of the invention.

FIG. 7 illustrates a computer system 700 upon which an embodiment of the invention may be implemented. Although computer system 700 is depicted with respect to a particular device or equipment, it is contemplated that other devices or equipment (e.g., network elements, servers, etc.) within FIG. 7 can deploy the illustrated hardware and components of system 700. Computer system 700 is programmed (e.g., via computer program code or instructions) to provide incremental database updates based on delta pages as described herein and includes a communication mechanism such as a bus 710 for passing information between other internal and external components of the computer system 700. Information (also called data) is represented as a physical expression of a measurable phenomenon, typically electric voltages, but including, in other embodiments, such phenomena as magnetic, electromagnetic, pressure, chemical, biological, molecular, atomic, sub-atomic and quantum interactions. For example, north and south magnetic fields, or a zero and non-zero electric voltage, represent two states (0, 1) of a binary digit (bit). Other phenomena can represent digits of a higher base. A superposition of multiple simultaneous quantum states before measurement represents a quantum bit (qubit). A sequence of one or more digits constitutes digital data that is used to represent a number or code for a character. In some embodiments, information called analog data is represented by a near continuum of measurable values within a particular range. Computer system 700, or a portion thereof, constitutes a means for performing one or more steps of providing incremental database updates based on delta pages.

A bus 710 includes one or more parallel conductors of information so that information is transferred quickly among devices coupled to the bus 710. One or more processors 702 for processing information are coupled with the bus 710.

A processor (or multiple processors) 702 performs a set of operations on information as specified by computer program code related to providing incremental database updates based on delta pages. The computer program code is a set of instructions or statements providing instructions for the operation of the processor and/or the computer system to perform specified functions. The code, for example, may be written in a computer programming language that is compiled into a native instruction set of the processor. The code may also be written directly using the native instruction set (e.g., machine language). The set of operations include bringing information in from the bus 710 and placing information on the bus 710. The set of operations also typically include comparing two or more units of information, shifting positions of units of information, and combining two or more units of information, such as by addition or multiplication or logical operations like OR, exclusive OR (XOR), and AND. Each operation of the set of operations that can be performed by the processor is represented to the processor by information called instructions, such as an operation code of one or more digits. A sequence of operations to be executed by the processor 702, such as a sequence of operation codes, constitute processor instructions, also called computer system instructions or, simply, computer instructions. Processors may be implemented as mechanical, electrical, magnetic, optical, chemical or quantum components, among others, alone or in combination.

Computer system 700 also includes a memory 704 coupled to bus 710. The memory 704, such as a random access memory (RAM) or any other dynamic storage device, stores information including processor instructions for providing incremental database updates based on delta pages. Dynamic memory allows information stored therein to be changed by the computer system 700. RAM allows a unit of information stored at a location called a memory address to be stored and retrieved independently of information at neighboring addresses. The memory 704 is also used by the processor 702 to store temporary values during execution of processor instructions. The computer system 700 also includes a read only memory (ROM) 706 or any other static storage device coupled to the bus 710 for storing static information, including instructions, that is not changed by the computer system 700. Some memory is composed of volatile storage that loses the information stored thereon when power is lost. Also coupled to bus 710 is a non-volatile (persistent) storage device 708, such as a magnetic disk, optical disk or flash card, for storing information, including instructions, that persists even when the computer system 700 is turned off or otherwise loses power.

Information, including instructions for providing incremental database updates based on delta pages, is provided to the bus 710 for use by the processor from an external input device 712, such as a keyboard containing alphanumeric keys operated by a human user, a microphone, an Infrared (IR) remote control, a joystick, a game pad, a stylus pen, a touch screen, or a sensor. A sensor detects conditions in its vicinity and transforms those detections into physical expression compatible with the measurable phenomenon used to represent information in computer system 700. Other external devices coupled to bus 710, used primarily for interacting with humans, include a display device 714, such as a cathode ray tube (CRT), a liquid crystal display (LCD), a light emitting diode (LED) display, an organic LED (OLED) display, a plasma screen, or a printer for presenting text or images, and a pointing device 716, such as a mouse, a trackball, cursor direction keys, or a motion sensor, for controlling a position of a small cursor image presented on the display 714 and issuing commands associated with graphical elements presented on the display 714. In some embodiments, for example, in embodiments in which the computer system 700 performs all functions automatically without human input, one or more of external input device 712, display device 714 and pointing device 716 is omitted.

In the illustrated embodiment, special purpose hardware, such as an application specific integrated circuit (ASIC) 720, is coupled to bus 710. The special purpose hardware is configured to perform operations not performed by processor 702 quickly enough for special purposes. Examples of ASICs include graphics accelerator cards for generating images for display 714, cryptographic boards for encrypting and decrypting messages sent over a network, speech recognition, and interfaces to special external devices, such as robotic arms and medical scanning equipment that repeatedly perform some complex sequence of operations that are more efficiently implemented in hardware.

Computer system 700 also includes one or more instances of a communications interface 770 coupled to bus 710. Communication interface 770 provides a one-way or two-way communication coupling to a variety of external devices that operate with their own processors, such as printers, scanners and external disks. In general the coupling is with a network link 778 that is connected to a local network 780 to which a variety of external devices with their own processors are connected. For example, communication interface 770 may be a parallel port or a serial port or a universal serial bus (USB) port on a personal computer. In some embodiments, communications interface 770 is an integrated services digital network (ISDN) card or a digital subscriber line (DSL) card or a telephone modem that provides an information communication connection to a corresponding type of telephone line. In some embodiments, a communication interface 770 is a cable modem that converts signals on bus 710 into signals for a communication connection over a coaxial cable or into optical signals for a communication connection over a fiber optic cable. As another example, communications interface 770 may be a local area network (LAN) card to provide a data communication connection to a compatible LAN, such as Ethernet. Wireless links may also be implemented. For wireless links, the communications interface 770 sends or receives or both sends and receives electrical, acoustic or electromagnetic signals, including infrared and optical signals, that carry information streams, such as digital data. For example, in wireless handheld devices, such as mobile telephones like cell phones, the communications interface 770 includes a radio band electromagnetic transmitter and receiver called a radio transceiver. In certain embodiments, the communications interface 770 enables connection to the communication network 105 for providing incremental database updates based on delta pages.

The term "computer-readable medium" as used herein refers to any medium that participates in providing information to processor 702, including instructions for execution. Such a medium may take many forms, including, but not limited to computer-readable storage medium (e.g., non-volatile media, volatile media), and transmission media. Non-transitory media, such as non-volatile media, include, for example, optical or magnetic disks, such as storage device 708. Volatile media include, for example, dynamic memory 704. Transmission media include, for example, twisted pair cables, coaxial cables, copper wire, fiber optic cables, and carrier waves that travel through space without wires or cables, such as acoustic waves and electromagnetic waves, including radio, optical and infrared waves. Signals include man-made transient variations in amplitude, frequency, phase, polarization or other physical properties transmitted through the transmission media. Common forms of computer-readable media include, for example, a floppy disk, a flexible disk, hard disk, magnetic tape, any other magnetic medium, a CD-ROM, CDRW, DVD, any other optical medium, punch cards, paper tape, optical mark sheets, any other physical medium with patterns of holes or other optically recognizable indicia, a RAM, a PROM, an EPROM, a FLASH-EPROM, an EEPROM, a flash memory, any other memory chip or cartridge, a carrier wave, or any other medium from which a computer can read. The term computer-readable storage medium is used herein to refer to any computer-readable medium except transmission media.

Logic encoded in one or more tangible media includes one or both of processor instructions on a computer-readable storage media and special purpose hardware, such as ASIC 720.

Network link 778 typically provides information communication using transmission media through one or more networks to other devices that use or process the information. For example, network link 778 may provide a connection through local network 780 to a host computer 782 or to equipment 784 operated by an Internet Service Provider (ISP). ISP equipment 784 in turn provides data communication services through the public, world-wide packet-switching communication network of networks now commonly referred to as the Internet 790.

A computer called a server host 792 connected to the Internet hosts a process that provides a service in response to information received over the Internet. For example, server host 792 hosts a process that provides information representing video data for presentation at display 714. It is contemplated that the components of system 700 can be deployed in various configurations within other computer systems, e.g., host 782 and server 792.

At least some embodiments of the invention are related to the use of computer system 700 for implementing some or all of the techniques described herein. According to one embodiment of the invention, those techniques are performed by computer system 700 in response to processor 702 executing one or more sequences of one or more processor instructions contained in memory 704. Such instructions, also called computer instructions, software and program code, may be read into memory 704 from another computer-readable medium such as storage device 708 or network link 778. Execution of the sequences of instructions contained in memory 704 causes processor 702 to perform one or more of the method steps described herein. In alternative embodiments, hardware, such as ASIC 720, may be used in place of or in combination with software to implement the invention. Thus, embodiments of the invention are not limited to any specific combination of hardware and software, unless otherwise explicitly stated herein.

The signals transmitted over network link 778 and other networks through communications interface 770, carry information to and from computer system 700. Computer system 700 can send and receive information, including program code, through the networks 780, 790 among others, through network link 778 and communications interface 770. In an example using the Internet 790, a server host 792 transmits program code for a particular application, requested by a message sent from computer 700, through Internet 790, ISP equipment 784, local network 780 and communications interface 770. The received code may be executed by processor 702 as it is received, or may be stored in memory 704 or in storage device 708 or any other non-volatile storage for later execution, or both. In this manner, computer system 700 may obtain application program code in the form of signals on a carrier wave.

Various forms of computer readable media may be involved in carrying one or more sequence of instructions or data or both to processor 702 for execution. For example, instructions and data may initially be carried on a magnetic disk of a remote computer such as host 782. The remote computer loads the instructions and data into its dynamic memory and sends the instructions and data over a telephone line using a modem. A modem local to the computer system 700 receives the instructions and data on a telephone line and uses an infra-red transmitter to convert the instructions and data to a signal on an infra-red carrier wave serving as the network link 778. An infrared detector serving as communications interface 770 receives the instructions and data carried in the infrared signal and places information representing the instructions and data onto bus 710. Bus 710 carries the information to memory 704 from which processor 702 retrieves and executes the instructions using some of the data sent with the instructions. The instructions and data received in memory 704 may optionally be stored on storage device 708, either before or after execution by the processor 702.

FIG. 8 illustrates a chip set or chip 800 upon which an embodiment of the invention may be implemented. Chip set 800 is programmed to provide incremental database updates based on delta pages as described herein and includes, for instance, the processor and memory components described with respect to FIG. 7 incorporated in one or more physical packages (e.g., chips). By way of example, a physical package includes an arrangement of one or more materials, components, and/or wires on a structural assembly (e.g., a baseboard) to provide one or more characteristics such as physical strength, conservation of size, and/or limitation of electrical interaction. It is contemplated that in certain embodiments the chip set 800 can be implemented in a single chip. It is further contemplated that in certain embodiments the chip set or chip 800 can be implemented as a single "system on a chip." It is further contemplated that in certain embodiments a separate ASIC would not be used, for example, and that all relevant functions as disclosed herein would be performed by a processor or processors. Chip set or chip 800, or a portion thereof, constitutes a means for performing one or more steps of providing user interface navigation information associated with the availability of functions. Chip set or chip 800, or a portion thereof, constitutes a means for performing one or more steps of providing incremental database updates based on delta pages.

In one embodiment, the chip set or chip 800 includes a communication mechanism such as a bus 801 for passing information among the components of the chip set 800. A processor 803 has connectivity to the bus 801 to execute instructions and process information stored in, for example, a memory 805. The processor 803 may include one or more processing cores with each core configured to perform independently. A multi-core processor enables multiprocessing within a single physical package. Examples of a multi-core processor include two, four, eight, or greater numbers of processing cores. Alternatively or in addition, the processor 803 may include one or more microprocessors configured in tandem via the bus 801 to enable independent execution of instructions, pipelining, and multithreading. The processor 803 may also be accompanied with one or more specialized components to perform certain processing functions and tasks such as one or more digital signal processors (DSP) 807, or one or more application-specific integrated circuits (ASIC) 809. A DSP 807 typically is configured to process real-world signals (e.g., sound) in real time independently of the processor 803. Similarly, an ASIC 809 can be configured to performed specialized functions not easily performed by a more general purpose processor. Other specialized components to aid in performing the inventive functions described herein may include one or more field programmable gate arrays (FPGA), one or more controllers, or one or more other special-purpose computer chips.

In one embodiment, the chip set or chip 800 includes merely one or more processors and some software and/or firmware supporting and/or relating to and/or for the one or more processors.

The processor 803 and accompanying components have connectivity to the memory 805 via the bus 801. The memory 805 includes both dynamic memory (e.g., RAM, magnetic disk, writable optical disk, etc.) and static memory (e.g., ROM, CD-ROM, etc.) for storing executable instructions that when executed perform the inventive steps described herein to provide incremental database updates based on delta pages. The memory 805 also stores the data associated with or generated by the execution of the inventive steps.

Figure 9:
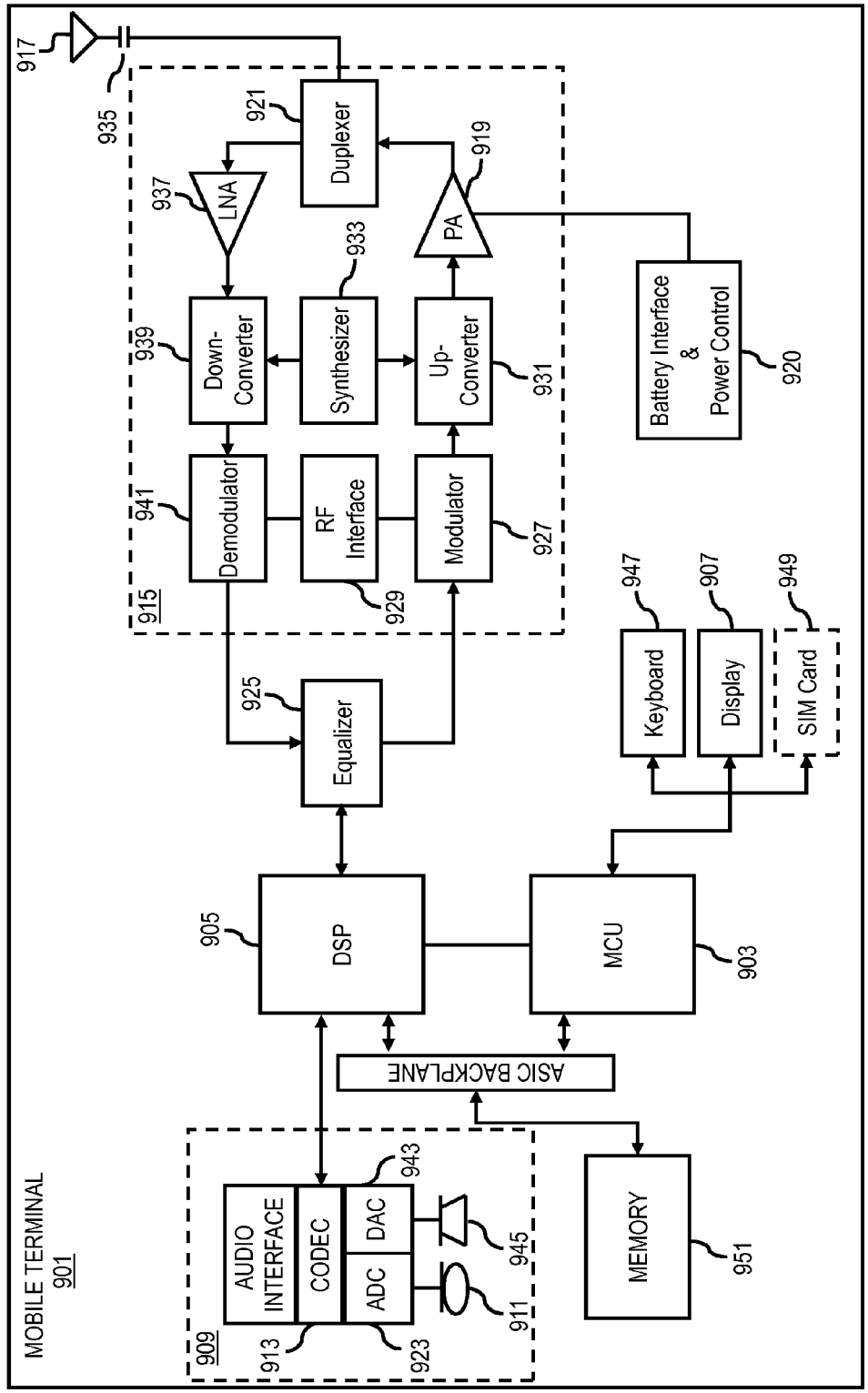
FIG. 9 is a diagram of a mobile terminal (e.g., handset) that can be used to implement an embodiment of the invention.

FIG. 9 is a diagram of exemplary components of a mobile terminal (e.g., handset) for communications, which is capable of operating in the system of FIG. 1, according to one embodiment. In some embodiments, mobile terminal 901, or a portion thereof, constitutes a means for performing one or more steps of providing incremental database updates based on delta pages. Generally, a radio receiver is often defined in terms of front-end and back-end characteristics. The front-end of the receiver encompasses all of the Radio Frequency (RF) circuitry whereas the back-end encompasses all of the base-band processing circuitry. As used in this application, the term "circuitry" refers to both: (1) hardware-only implementations (such as implementations in only analog and/or digital circuitry), and (2) to combinations of circuitry and software (and/or firmware) (such as, if applicable to the particular context, to a combination of processor(s), including digital signal processor(s), software, and memory(ies) that work together to cause an apparatus, such as a mobile phone or server, to perform various functions). This definition of "circuitry" applies to all uses of this term in this application, including in any claims. As a further example, as used in this application and if applicable to the particular context, the term "circuitry" would also cover an implementation of merely a processor (or multiple processors) and its (or their) accompanying software/or firmware. The term "circuitry" would also cover if applicable to the particular context, for example, a baseband integrated circuit or applications processor integrated circuit in a mobile phone or a similar integrated circuit in a cellular network device or other network devices.

Pertinent internal components of the telephone include a Main Control Unit (MCU) 903, a Digital Signal Processor (DSP) 905, and a receiver/transmitter unit including a microphone gain control unit and a speaker gain control unit. A main display unit 907 provides a display to the user in support of various applications and mobile terminal functions that perform or support the steps of providing incremental database updates based on delta pages. The display 907 includes display circuitry configured to display at least a portion of a user interface of the mobile terminal (e.g., mobile telephone). Additionally, the display 907 and display circuitry are configured to facilitate user control of at least some functions of the mobile terminal. An audio function circuitry 909 includes a microphone 911 and microphone amplifier that amplifies the speech signal output from the microphone 911. The amplified speech signal output from the microphone 911 is fed to a coder/decoder (CODEC) 913.

A radio section 915 amplifies power and converts frequency in order to communicate with a base station, which is included in a mobile communication system, via antenna 917. The power amplifier (PA) 919 and the transmitter/modulation circuitry are operationally responsive to the MCU 903, with an output from the PA 919 coupled to the duplexer 921 or circulator or antenna switch, as known in the art. The PA 919 also couples to a battery interface and power control unit 920.

In use, a user of mobile terminal 901 speaks into the microphone 911 and his or her voice along with any detected background noise is converted into an analog voltage. The analog voltage is then converted into a digital signal through the Analog to Digital Converter (ADC) 923. The control unit 903 routes the digital signal into the DSP 905 for processing therein, such as speech encoding, channel encoding, encrypting, and interleaving. In one embodiment, the processed voice signals are encoded, by units not separately shown, using a cellular transmission protocol such as enhanced data rates for global evolution (EDGE), general packet radio service (GPRS), global system for mobile communications (GSM), Internet protocol multimedia subsystem (IMS), universal mobile telecommunications system (UMTS), etc., as well as any other suitable wireless medium, e.g., microwave access (WiMAX), Long Term Evolution (LTE) networks, code division multiple access (CDMA), wideband code division multiple access (WCDMA), wireless fidelity (WiFi), satellite, and the like, or any combination thereof.

The encoded signals are then routed to an equalizer 925 for compensation of any frequency-dependent impairments that occur during transmission though the air such as phase and amplitude distortion. After equalizing the bit stream, the modulator 927 combines the signal with a RF signal generated in the RF interface 929. The modulator 927 generates a sine wave by way of frequency or phase modulation. In order to prepare the signal for transmission, an up-converter 931 combines the sine wave output from the modulator 927 with another sine wave generated by a synthesizer 933 to achieve the desired frequency of transmission. The signal is then sent through a PA 919 to increase the signal to an appropriate power level. In practical systems, the PA 919 acts as a variable gain amplifier whose gain is controlled by the DSP 905 from information received from a network base station. The signal is then filtered within the duplexer 921 and optionally sent to an antenna coupler 935 to match impedances to provide maximum power transfer. Finally, the signal is transmitted via antenna 917 to a local base station. An automatic gain control (AGC) can be supplied to control the gain of the final stages of the receiver. The signals may be forwarded from there to a remote telephone which may be another cellular telephone, any other mobile phone or a land-line connected to a Public Switched Telephone Network (PSTN), or other telephony networks.

Voice signals transmitted to the mobile terminal 901 are received via antenna 917 and immediately amplified by a low noise amplifier (LNA) 937. A down-converter 939 lowers the carrier frequency while the demodulator 941 strips away the RF leaving only a digital bit stream. The signal then goes through the equalizer 925 and is processed by the DSP 905. A Digital to Analog Converter (DAC) 943 converts the signal and the resulting output is transmitted to the user through the speaker 945, all under control of a Main Control Unit (MCU) 903 which can be implemented as a Central Processing Unit (CPU).

The MCU 903 receives various signals including input signals from the keyboard 947. The keyboard 947 and/or the MCU 903 in combination with other user input components (e.g., the microphone 911) comprise a user interface circuitry for managing user input. The MCU 903 runs a user interface software to facilitate user control of at least some functions of the mobile terminal 901 to provide incremental database updates based on delta pages. The MCU 903 also delivers a display command and a switch command to the display 907 and to the speech output switching controller, respectively. Further, the MCU 903 exchanges information with the DSP 905 and can access an optionally incorporated SIM card 949 and a memory 951. In addition, the MCU 903 executes various control functions required of the terminal. The DSP 905 may, depending upon the implementation, perform any of a variety of conventional digital processing functions on the voice signals. Additionally, DSP 905 determines the background noise level of the local environment from the signals detected by microphone 911 and sets the gain of microphone 911 to a level selected to compensate for the natural tendency of the user of the mobile terminal 901.

The CODEC 913 includes the ADC 923 and DAC 943. The memory 951 stores various data including call incoming tone data and is capable of storing other data including music data received via, e.g., the global Internet. The software module could reside in RAM memory, flash memory, registers, or any other form of writable storage medium known in the art. The memory device 951 may be, but not limited to, a single memory, CD, DVD, ROM, RAM, EEPROM, optical storage, magnetic disk storage, flash memory storage, or any other non-volatile storage medium capable of storing digital data.

An optionally incorporated SIM card 949 carries, for instance, important information, such as the cellular phone number, the carrier supplying service, subscription details, and security information. The SIM card 949 serves primarily to identify the mobile terminal 901 on a radio network. The card 949 also contains a memory for storing a personal telephone number registry, text messages, and user specific mobile terminal settings.

While the invention has been described in connection with a number of embodiments and implementations, the invention is not so limited but covers various obvious modifications and equivalent arrangements, which fall within the purview of the appended claims. Although features of the invention are expressed in certain combinations among the claims, it is contemplated that these features can be arranged in any combination and order.

What is claimed is:

1. A method comprising facilitating a processing of and/or processing (1) data and/or (2) information and/or (3) at least one signal, the (1) data and/or (2) information and/or (3) at least one signal based, at least in part, on the following:
   at least one new page of a first database;
   at least one reference page of a second database;
   a processing of the at least one new page and the at least one reference page to determine at least one minimal difference patch comprising one or more differences between the at least one new page and the at least one reference page,
      wherein the at least one new page can be constructed from the at least one reference page and the at least one minimal difference patch,
   a generation of at least one update package comprising the at least one minimal difference patch and an index to the at least one reference page; and
   a transmission of the at least one update package to a device associated with the second database.

2. A method of claim 1, wherein the (1) data and/or (2) information and/or (3) at least one signal are further based, at least in part, on the following:
   at least one determination of one or more candidate reference pages of the second database;
   at least one determination of one or more candidate minimal difference patches for the one or more candidate reference pages; and
   a selection of the at least one reference page from among the one or more candidate reference pages based, at least in part, on a minimal difference criteria for the one or more candidate minimal difference patches.

3. A method of claim 2, wherein the (1) data and/or (2) information and/or (3) at least one signal are further based, at least in part, on the following:
   at least one determination of the one or more candidate reference pages based, at least in part, on a data type associated with the at least one new page.

4. A method of claim 2, wherein the (1) data and/or (2) information and/or (3) at least one signal are further based, at least in part, on the following:
   at least one determination of the one or more candidate reference pages based, at least in part, on a distance threshold from at least one last best fitting reference page.

5. A method of claim 4, wherein the (1) data and/or (2) information and/or (3) at least one signal are further based, at least in part, on the following:
   at least one determination of a similarity index of the one or more candidate reference pages; and
   a selection of the at least one last best fitting reference page from among the one or more candidate reference pages based, at least in part, on the similarity index.

6. A method comprising facilitating a processing of and/or processing (1) data and/or (2) information and/or (3) at least one signal, the (1) data and/or (2) information and/or (3) at least one signal based, at least in part, on the following:
   a receipt of at least one update package at a device,
   wherein the at least one update package comprises at least one minimal difference patch based, at least in part, on one or more differences between at least one new page of a first database and at least one reference page of a second database associated with the device and an index to the at least one reference page; and
   wherein the at least one new page can be constructed from the at least one reference page and the at least one minimal difference patch.

7. A method of claim 6, wherein the (1) data and/or (2) information and/or (3) at least one signal are further based, at least in part, on the following:
   a request from at least one caller for information associated with the at least one new page;
   a construction of the at least one new page from the at least one reference page and the at least one minimal difference patch in response to the request; and
   a return of the at least one new page to the at least one caller.

8. A method of claim 7, wherein the (1) data and/or (2) information and/or (3) at least one signal are further based, at least in part, on the following:
   a storage of the at least one new page in the second database for responding to one or more subsequent calls for the at least one new page.

9. A method of claim 6, wherein the (1) data and/or (2) information and/or (3) at least one signal are further based, at least in part, on the following:
   an overwriting of the at least one reference page based, at least in part, on a determination of whether the at least one minimal difference patch, one or more other pending difference patches, or a combination thereof depend on the at least one reference page.

10. An apparatus comprising:
   at least one processor; and
   at least one memory including computer program code for one or more programs,
   the at least one memory and the computer program code configured to, with the at least one processor, cause the apparatus to perform at least the following,
   determine at least one new page of a first database,
   determine at least one reference page of a second database,
   process and/or facilitate a processing of the at least one new page and the at least one reference page to determine at least one minimal difference patch comprising one or more differences between the at least one new page and the at least one reference page,
   wherein the at least one new page can be constructed from the at least one reference page and the at least one minimal difference patch,
   cause, at least in part, a generation of at least one update package comprising the at least one minimal difference patch and an index to the at least one reference page, and
   cause, at least in part, a transmission of the at least one update package to a device associated with the second database.

11. An apparatus of claim 10, wherein the apparatus is further caused to:
  determine one or more candidate reference pages of the second database,
  determine one or more candidate minimal difference patches for the one or more candidate reference pages, and
  cause, at least in part, a selection of the at least one reference page from among the one or more candidate reference pages based, at least in part, on a minimal difference criteria for the one or more candidate minimal difference patches.

12. An apparatus of claim 11, wherein the apparatus is further caused to:
  determine the one or more candidate reference pages based, at least in part, on a data type associated with the at least one new page.

13. An apparatus of claim 11, wherein the apparatus is further caused to:
  determine the one or more candidate reference pages based, at least in part, on a distance threshold from at least one last best fitting reference page.

14. An apparatus of claim 13, wherein the apparatus is further caused to:
  determine a similarity index of the one or more candidate reference pages, and
  cause, at least in part, a selection of the at least one last best fitting reference page from among the one or more candidate reference pages based, at least in part, on the similarity index.

15. An apparatus comprising:
  at least one processor; and
  at least one memory including computer program code for one or more programs,
  the at least one memory and the computer program code configured to, with the at least one processor, cause the apparatus to perform at least the following,
  receive at least one update package at a device,
  wherein the at least one update package comprises at least one minimal difference patch based, at least in part, on one or more differences between at least one new page of a first database and at least one reference page of a second database associated with the device and an index to the at least one reference page, and
  wherein the at least one new page can be constructed from the at least one reference page and the at least one minimal difference patch.

16. An apparatus of claim 15, wherein the apparatus is further caused to:
  determine a request from at least one caller for information associated with the at least one new page,
  cause, at least in part, a construction of the at least one new page from the at least one reference page and the at least one minimal difference patch in response to the request, and
  cause, at least in part, a return of the at least one new page to the at least one caller.

17. An apparatus of claim 16, wherein the apparatus is further caused to:
  cause, at least in part, a storage of the at least one new page in the second database for responding to one or more subsequent calls for the at least one new page.

18. An apparatus of claim 15, wherein the apparatus is further caused to:
  cause, at least in part, an overwriting of the at least one reference page based, at least in part, on a determination of whether the at least one minimal difference patch, one or more other pending difference patches, or a combination thereof depend on the at least one reference page.

* * * * *